US010022832B2

(12) United States Patent
Piner et al.

(10) Patent No.: US 10,022,832 B2
(45) Date of Patent: Jul. 17, 2018

(54) FINE-TUNING SPEED APPLICATION INTERFACE

(71) Applicant: DMG Mori Seiki Co., Ltd., Yamatokoriyama-shi (JP)

(72) Inventors: Zachary Piner, West Sacramento, CA (US); Ke Ding, Davis, CA (US); Mehdi Namazi, West Sacramento, CA (US); Kyle Konishi, Sacramento, CA (US)

(73) Assignee: DMG Mori Seiki Co., Ltd., Yamatokoriyama-shi (JP)

( * ) Notice: Subject to any disclaimer, the term of this patent is extended or adjusted under 35 U.S.C. 154(b) by 411 days.

(21) Appl. No.: 14/674,291

(22) Filed: Mar. 31, 2015

(65) Prior Publication Data
US 2016/0288285 A1 Oct. 6, 2016

(51) Int. Cl.
*G06F 19/00* (2018.01)
*B23Q 15/12* (2006.01)
*G05B 19/404* (2006.01)
*B23Q 15/08* (2006.01)
*B23Q 17/12* (2006.01)

(52) U.S. Cl.
CPC .......... *B23Q 15/12* (2013.01); *B23Q 15/08* (2013.01); *B23Q 17/12* (2013.01); *G05B 19/404* (2013.01); *G05B 2219/41256* (2013.01)

(58) Field of Classification Search
CPC .................................... G05B 19/4163
USPC ....................................... 700/173
See application file for complete search history.

(56) References Cited

U.S. PATENT DOCUMENTS

| | | | | |
|---|---|---|---|---|
| 5,170,358 | A * | 12/1992 | Delio | G05B 19/4163 173/2 |
| 6,085,121 | A | 7/2000 | Stern | |
| 6,241,435 | B1 * | 6/2001 | Huang | B23Q 5/225 318/575 |
| 6,672,168 | B2 | 1/2004 | Higgins | |
| 8,374,717 | B2 * | 2/2013 | Suzuki | B23Q 11/0039 409/131 |
| 8,700,201 | B2 * | 4/2014 | Yoshino | B23Q 17/0976 700/174 |
| 8,862,429 | B2 | 10/2014 | Ando et al. | |
| 9,682,455 | B2 * | 6/2017 | Piner | G05B 19/404 |

(Continued)

FOREIGN PATENT DOCUMENTS

JP 2012187685 A * 10/2012

OTHER PUBLICATIONS

Altintas et al, Analytical Prediction of Stability Lobes in Milling, Jan. 9, 1995, pp. 6.*

(Continued)

*Primary Examiner* — Suresh Suryawanshi
(74) *Attorney, Agent, or Firm* — Oblon, McClelland, Maier & Neustadt, L.L.P.

(57) ABSTRACT

A system, method and computer-readable medium for fine-tuning speed selection for reducing machine chatter. The system includes circuitry configured to determine a predetermined speed of the machine. The circuitry identifies a stability lobe based on the predetermined speed of the machine and selects a first set of fine-tuning speeds from a range of machine speeds corresponding to the determined stability lobe. Further, the circuitry causes the machine to operate at one or more of the first set of fine-tuning speeds.

21 Claims, 14 Drawing Sheets

(56) References Cited

U.S. PATENT DOCUMENTS

| | | | |
|---|---|---|---|
| 2002/0146296 A1* | 10/2002 | Schmitz | B23Q 17/0976 409/131 |
| 2011/0135415 A1 | 6/2011 | Hamaguchi et al. | |
| 2012/0010744 A1* | 1/2012 | Yamashita | B23Q 15/12 700/173 |
| 2012/0093598 A1* | 4/2012 | Ando | B23Q 17/007 408/16 |
| 2015/0160643 A1 | 6/2015 | Fujimoto et al. | |
| 2015/0294034 A1* | 10/2015 | Liao | G06F 17/5018 703/1 |

OTHER PUBLICATIONS

Office Action dated Sep. 27, 2016 in co-pending U.S. Appl. No. 14/526,111.
U.S. Appl. No. 14/526,111, filed Oct. 28, 2014, Piner, et al.

* cited by examiner

Legend

| Lobe #<br>Speed<br>Chatter-level | Speed buttons |

| Speed | Fine tuning<br>speed buttons |

FINE-TUNING SPEED APPLICATION INTERFACE

BACKGROUND

Field of the Disclosure

This application relates to a system, method, computer-readable medium, and interface for reducing machine tool chatter.

Description of the Related Art

As described for example in U.S. Pat. No. 5,170,358, which is incorporated herein by reference in its entirety, chatter or instability in machining operations, such as turning, boring, milling, and the like, is a common problem in industry. Vibrations are primarily categorized into free, forced, and self-excited vibrations. Chatter is a type of self-excited vibration commonly observed during a machining operation (or process). Chatter can also be produced from forced vibrations under certain operating conditions.

Chatter is unwanted vibrations observed during the machining operation. It can be caused by a detrimental vibration feedback loop through a machine tool, a work piece, and a machine. When occurring, vibrations from the feedback loop can often be attenuated by changing tool rotation speed (changing driving vibration frequency) in relation to chatter frequency (response frequency). Embodiments of the present disclosure are directed to facilitating chatter reduction.

SUMMARY

According to an embodiment of the present disclosure, there is provided a system. The system includes circuitry configured to determine a predetermined speed of the machine. The circuitry identifies a stability lobe based on the predetermined speed of the machine and selects a first set of fine-tuning speeds from a range of machine speeds corresponding to the determined stability lobe. Further, the circuitry causes the machine to operate at one or more of the first set of fine-tuning speeds.

Further, according to an embodiment of the present disclosure, there is provided a method of fine-tuning speed selection for reducing machine chatter. The method includes determining, by circuitry of a system, a predetermined speed of the machine. A stability lobe is identified by the circuitry based on the predetermined speed of the machine. A first set of fine-tuning speeds is selected by the circuitry from a range of machine speeds corresponding to the determined stability lobe. Further, the method includes causing the machine to operate at one or more of the first set of fine-tuning speeds.

Further, according to an embodiment of the present disclosure, there is provided a non-transitory computer-readable medium which stores a program which, when executed by a computer, causes the computer to perform the method of fine-tuning speed selection for reducing machine chatter, as discussed above.

The forgoing general description of the illustrative implementations and the following detailed description thereof are merely exemplary aspects of the teachings of this disclosure, and are not restrictive.

DETAILED DESCRIPTION

Figure 1:
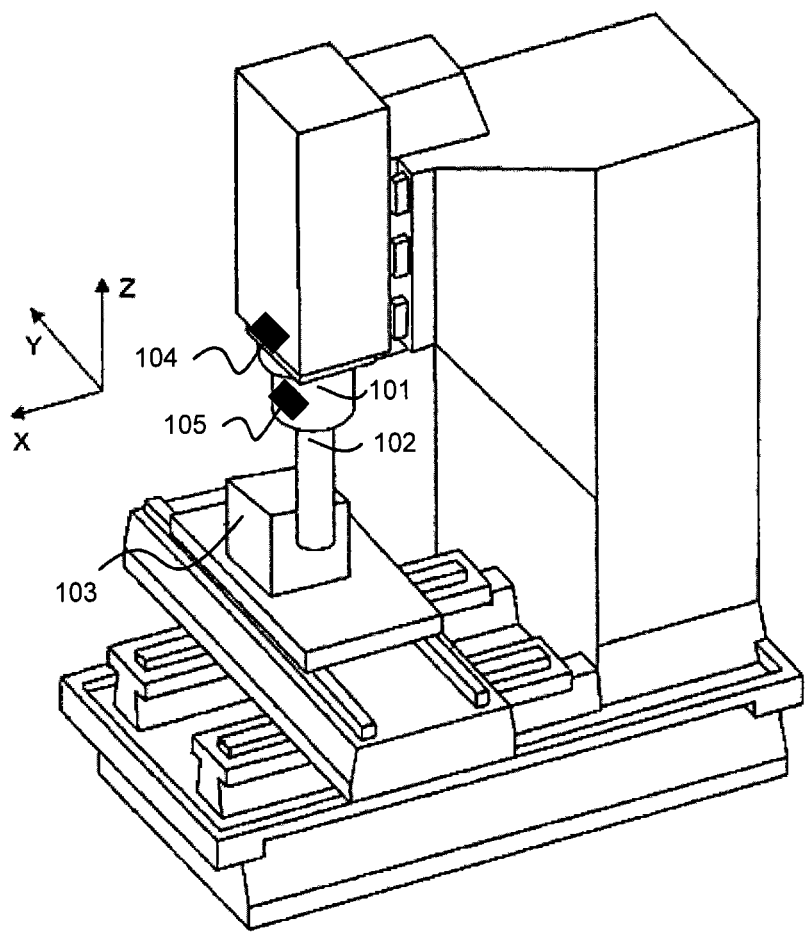
FIG. 1 depicts an exemplary machine tool that may generate chatter according to one embodiment.

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures or flowcharts.

Furthermore, the terms "approximately," "proximate," "minor," and similar terms generally refer to ranges that include the identified value within a margin of 20%, 10%, or preferably 5% in certain embodiments, and any values therebetween.

The terms "speed", "spindle speed", "selected speed", and similar terms refers to "tool rotation speed" or "work piece rotation speed" in revolutions per minute (rpm) unless specified otherwise. However, embodiments of the present disclosure are not so limited and it is understood that other units of speed may be utilized.

Vibrations generated during a machining operation can be monitored using for example one or more sensors. The one or more sensors may be configured to directly or indirectly measure the vibrations during the machining operations. Sensor data received from the one or more sensors can be used to calculate chatter-reducing rotation speeds, for example using one or more methods to eliminate the phase difference between driving and driven vibrations. Based on the calculated speeds, chatter may be eliminated or reduced by manually or automatically changing the rotation speed.

In certain embodiments, the machine is controlled by one or more computer numerical control (CNC) machines. The CNC machines typically implements an NC program, written in a programming language such as G-code, that controls tool or work piece related parameters such as speed, machining co-ordinates, type of tool, etc. That is, the NC program includes machining instructions such as how to move the tool or work piece, what speed to rotate the tools or work pieces, etc. The rotation speed may also be controlled by an operator (or user) via one or more user interfaces provided by the one or more CNC machines or a separate computer. The user interface may be configured to display one or a combination of chatter data and chatter-reducing calculation results to guide users to activate one or more desired rotation speeds. However, in such a configuration, the speed data, chatter data, and activation method can be highly disconnected.

To address this issue, chatter history data can be integrated with corresponding speed information and provided to an operator. When trying multiple rotation speeds to find an optimal one, a history of tried speeds (or previously selected speeds) and corresponding chatter magnitudes can be saved and displayed to the operator. Such data may be displayed in the form of tables or graphs. However, due to screen size limitations, it may not be practical to concurrently show a full range of chatter data.

In order to more effectively and economically reduce chatter during one or more machining operations, interfaces and/or methods that facilitate selections of operating speeds in an iterative manner are needed. In the case of fine-tune speed resolution based on stability lobe theory, stability lobe theory alone cannot find the best speed likely due to multiple chatter frequencies or inherent inaccuracies of the method. However, there are predicted to be a non-random periodicity to stable versus unstable speeds across a given speed range, and this fact can be used to determine the most efficient speed resolution to use for fine-tuning.

Figure 10:
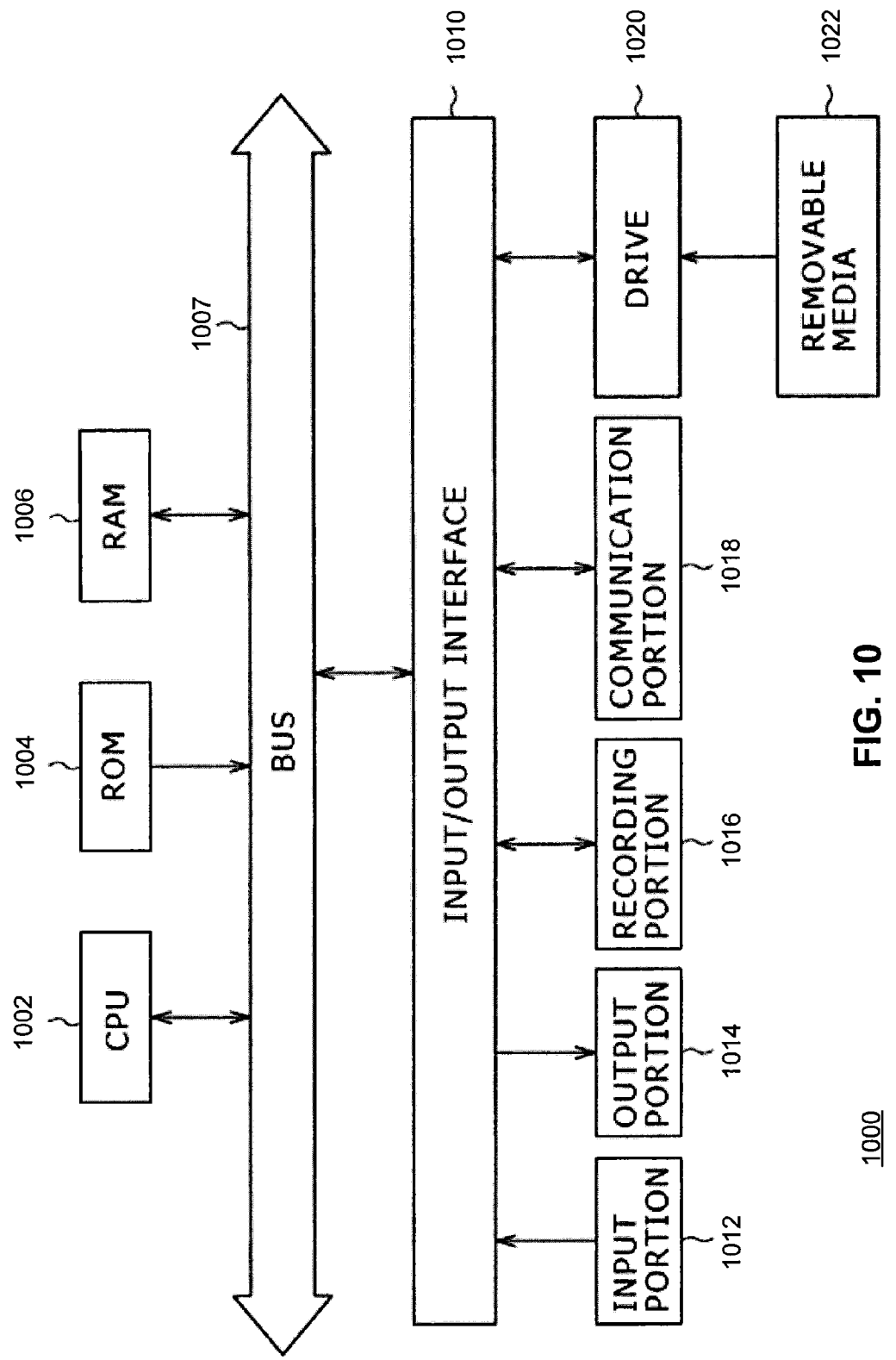
FIG. 10 depicts a block diagram showing an example of a hardware configuration of a computer.

FIG. 1 depicts an exemplary machine 100 according to an embodiment of the present disclosure. The machine 100 comprises a spindle housing 101, a cutting tool 102 (e.g., a cutting, turning, boring, or milling tool), a work piece 103, and one or more sensors (e.g., vibration sensors 104 and 105). The spindle housing 101 contains a mechanism to hold the cutting tool 102 in a desired position. The spindle housing 101 also contains a motor (not shown) which rotates the cutting tool 102 at different speeds. The cutting tool 102 rotates at a selected speed while contacting the work piece 103, to for example shape the work piece 103 by removing material. The movement of the cutting tool 102 and the work piece 103 is controlled through a computer 1000, for example as illustrated in FIG. 10, and/or operator actions. However, as noted above, in another embodiment, the work piece 103 may be rotated while the cutting tool 102 remains fixed, for example using a lathe (a turning machine).

Vibration sensors 104 and 105 are placed on the spindle housing 101 in different locations. In certain embodiments, sensors may be placed on the work piece or vibrations may be measured indirectly, for example using a microphone to measure sound waves generated by the vibrations at the tool or work piece. A vibration sensor measures vibrations that occur during the machining process and provides vibration data to a control computer (e.g., the computer 1000), where the vibration data is processed.

The processed data may be displayed on a user interface with which an operator interacts to operate the machine 100. For instance, the vibration data, such as vibration magnitude data, may be used to calculate one or more optimum chatter reduction parameters such as speed which is displayed on the user interface. As the speed changes the vibration magnitude changes and the new data is provided in the interface. A speed at which a significantly low vibration magnitude is observed can be identified using the interface and can be a good evaluation method for identifying an optimum chatter level speed setting. The one or more parameters act as a guide to the operator, who can then make appropriate selections on the user interface to reduce chatter observed during one or more machining operations.

Figure 2A:
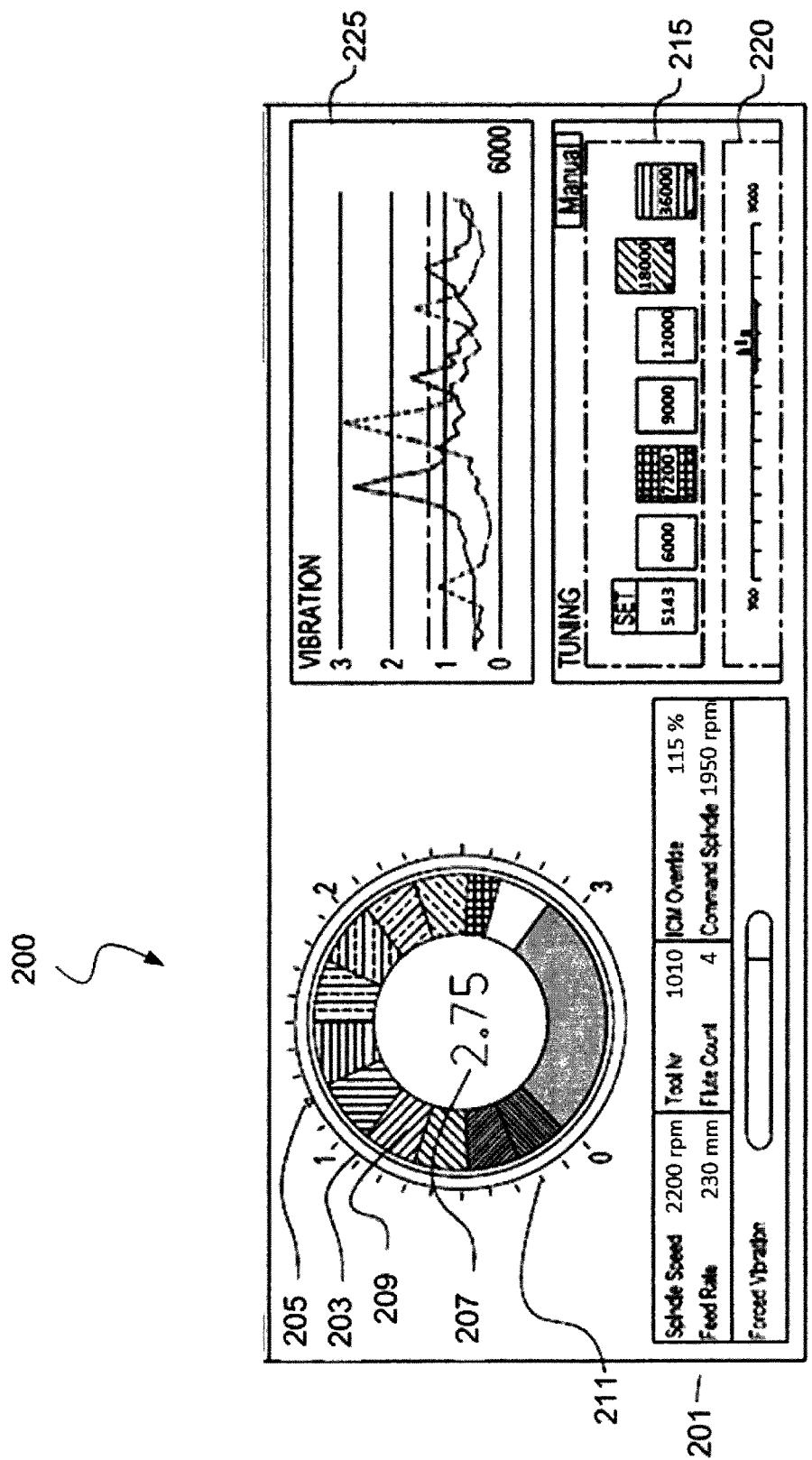
FIG. 2A depicts an exemplary chatter application interface according to one embodiment.

FIG. 2A is an exemplary illustration of a chatter application interface (CAI). The CAI includes one or more elements. For example, the CAI includes three elements such as a chatter gauge element 201, a vibration display element 225, a speed bar 215, and a history bar 220. Each element displays information relevant to controlling the chatter levels during a machining operation. The CAI is further described in U.S. application Ser. No. 14/256,111, filed Oct. 24, 2014, which is incorporated herein by reference in its entirety.

The chatter gauge element 201, in the present embodiment, is displayed as a circular dial 203 that comprises fixed gauge marks 211, an adjustable chatter threshold mark 205, current chatter level numerical display 207, and a current chatter-level indicator 209. The current chatter level numerical display and current chatter-level indicator 209 indicates the real-time chatter that occurs during the machining operation.

The speed bar 215 displays one or more selectable candidate speeds for a machining operation. The candidate speeds in the speed bar 215 are generated based on one or more non-chatter spindle speed calculations that will potentially reduce an existing chatter observed during the machining operation. Exemplary determination methods are described below. However, different methods can be used to perform the one or more calculations and the present embodiments are not limited to any particular calculation method. Various chatter reduction methods include the stability lobe method, time domain numerical modelling methods, analytical approaches that model tool or work dynamics, etc.

Figure 2B:
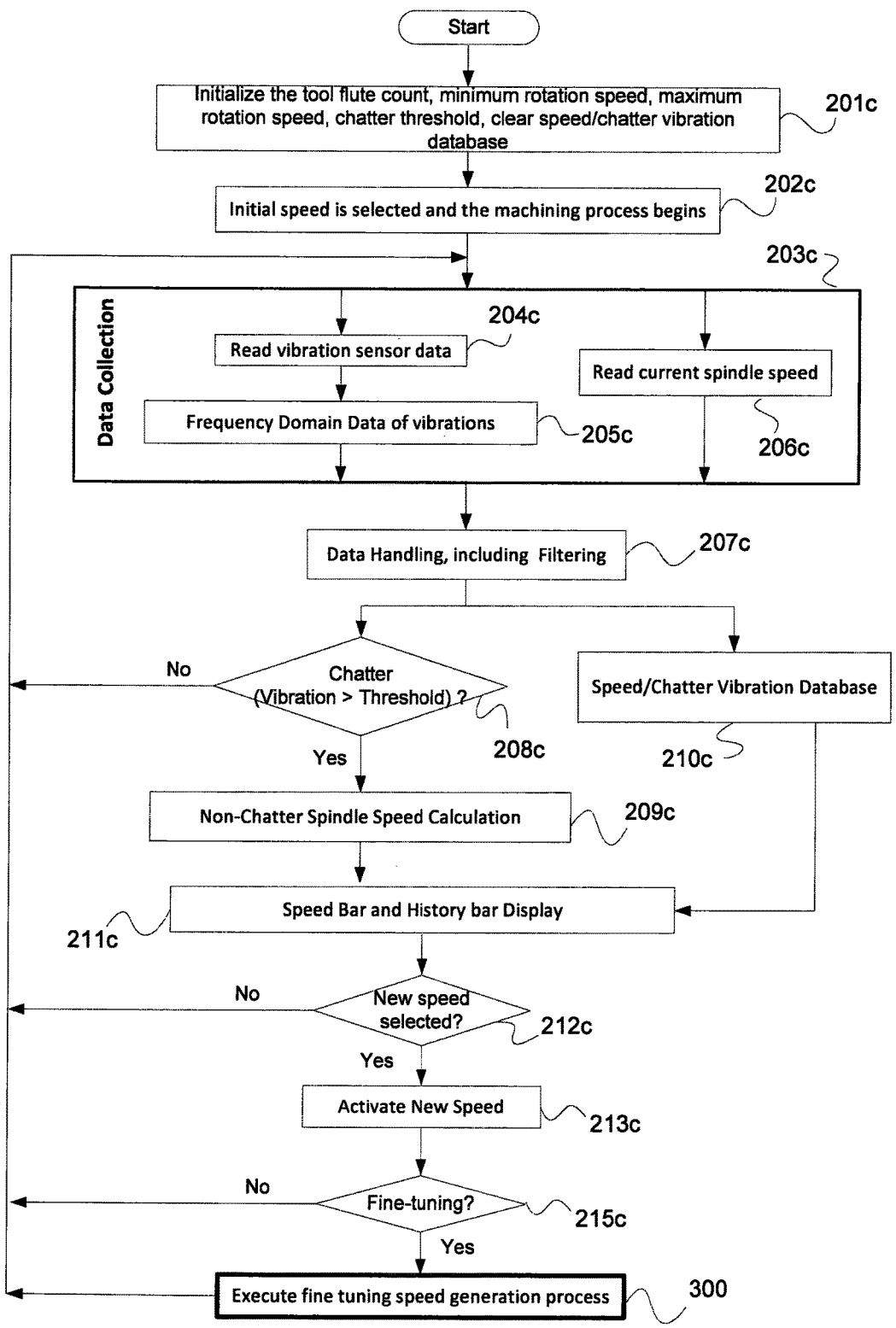
FIG. 2B illustrates a flow chart for creation of an exemplary chatter application interface according to one embodiment.

FIG. 2B is a flow chart of a method for generating the CAI according to an embodiment of the present disclosure. The CAI generation process starts as soon as the machine 100 is switched on or an initialization process is otherwise started. An initialization step 201c involves initializing one or more machining related parameters such as tool flute count, minimum rotation speed, maximum rotation speed, chatter threshold, and/or clearing a speed and chatter vibration database. In step 202c, an initial machining speed (or initial rotation speed setting) is selected (automatically or by an operator) and the machining process begins. The data collection step 203c involves reading or collecting data during the machining process. For example, reading vibration sensor data in step 204c or reading a current spindle speed in step 206c. Once the sensor data is collected, it can be converted into different forms. For instance, in step 205c the vibration sensor data is converted into frequency domain data using a Fast Fourier Transformation (FFT).

The data collection step 203c is followed by the data handling step 207c. In the data handling step 207c, the sensor data is processed as per design specifications (e.g., chatter calculation). For example, vibration data from a plurality of sensors are processed in some way (e.g., averaged, weighted). The processing of the vibration data includes generating (e.g., by determining or measuring) a chatter level value and a chatter frequency value based on the vibration data. In one embodiment, the chatter level value corresponds to the maximum chatter level that is detected during the use of that tool at that speed, and the chatter frequency is the frequency of the maximum vibration measured while that maximum chatter level occurred. The step 207c may also involve data filtering algorithms that may be used to eliminate vibration data incidental to chatter as well as the noise in the sensor data.

After the data handling step 207c, steps 208c and 210c are executed in parallel. Step 208c is a condition check that evaluates if the chatter vibration is greater than the chatter threshold that was set in step 201c. If the condition is evaluated as false (No) in step 208c, then the process returns to the step 203c. If the condition is evaluated as true (Yes) in step 208c, then the process proceeds to step 209c. In one embodiment, the process proceeds to step 209c irrespective of the condition check in 208c.

In step 209c, a non-chatter spindle speed calculation module (or a reduced chatter spindle speed calculation module) is utilized to calculate one or more candidate speeds, which is/are predicted to reduce or eliminate chatter. In one embodiment, the one or more candidate speeds are speeds for which chatter-levels are predicted to be lower than one or more predetermined chatter thresholds. The non-chatter spindle speed calculation module calculates the one or more candidate spindle speeds (or candidate rotation speed settings) which are provided in a speed bar of the CAI.

In one embodiment, the non-chatter spindle speed calculation is based on the stability lobe determination method (an exemplary stability lobe diagram is illustrated in FIG. 5). However, it is noted that various different methods can be used to perform the calculation and the present embodiments are not limited to any particular calculation method. Various chatter reduction methods include the stability lobe method, time domain numerical modelling methods, analytical approaches that model tool dynamics, etc.

An example approach for the non-chatter spindle speed calculation involves using equation 1.

$$n_{stable\ speed} = \frac{f_{chatter} * 60}{N_{flutes} * i} \quad (1)$$

Where, $n_{stable\ speed}$ Stable (non-chatter) speed in revolutions per min (rpm) for each lobe.
$f_{chatter}$ Chatter frequency in hertz (Hz)
$N_{flutes}$ Total number of tool flutes
i Lobe numbers—1, 2, 3, etc.

Equation 1 indicates that each lobe number is associated with a stable speed. The stable speed of a lobe corresponds to the peak in the stability lobe diagram, as illustrated for example in FIG. 5. As the lobe number decreases the stable speed increases.

The lobe numbers correspond to the whole number obtained from the ratio of base speed and a given machine speed (e.g., tool rotation or work piece rotation speed). Depending on the embodiment, the given machine speed may refer to a candidate speed or a current speed. For a maximum speed the lobe number is at its minimum. For a minimum speed the lobe number is at its maximum. The lobe number equation 2 is as follows:

$$\text{lobe number, } i = \frac{\text{Base speed}}{\text{given machine speed}} \quad (2)$$

Base speed is calculated using equation 3 as follows:

$$\text{Base speed} = \frac{f_{chatter} * 60}{N_{flutes}} \quad (3)$$

In step 210c, the speed and chatter vibration data from step 207c is stored in one or more databases. The speed and chatter vibration data can be extracted on demand in other steps such as step 211c. In certain embodiments, the one or more databases are also configured to store speed and chatter vibration data from one or more different past machining operations, for example involving a different work piece but the same cutting tool. All or a subset of speed and chatter vibration data from the one or more different past machining operations may be stored in the one or more databases. The subset of speed and chatter vibration data may be selected based on one or more speeds associated with the lowest chatter vibration levels.

In step 211c, a speed bar display is generated. The speed bar is configured to display one or a combination of previously selected speeds (e.g., including an initial speed and/or one or more tried speeds) from the speed and the chatter vibration databases, and the candidate speeds calculated in step 209c. An exemplary speed bar 215 display is illustrated in FIG. 2A. The candidate speed options displayed in the speed bar may or may not be selected.

In step 212c a determination is made as to whether a new speed has been selected from among the candidate speeds displayed in the speed bar. If a new speed is not selected, then the process returns to step 203c. If a new speed is selected, then step 213c is executed and the new speed is activated. For a manual speed change, the new speed from the speed bar display may be selected by an operator using the CAI. However, speed changes may be selected automatically according to certain embodiments.

Further, in step 215c a determination is made as to whether fine-tuning is to be performed. If fine-tuning is to be performed, then the fine-tuning speed generation process in step 300 is performed. If fine-tuning is not to be performed, then the process returns to data collection step 203c. The fine-tuning process may be activated automatically or manually. Automatic fine-tuning determination can be made based on a difference between the current chatter and the chatter threshold. For instance, if the difference is greater than 10%, the fine-tuning speeds will automatically pop-up in the speed bar and/or an automatic fine-tuning process may be performed. In a manual setting, a fine-tuning or zoom button may be provided. When the fine-tuning or zoom button is activated by an operator, the fine-tuning speeds pop-up in the speed bar and/or an automatically fine-tuning process may be performed. Alternatively, the fine-tuning process may be activated in any other matter, such as when an operator double taps, or otherwise repeats a selection of, a current or other speed.

Figure 3A:
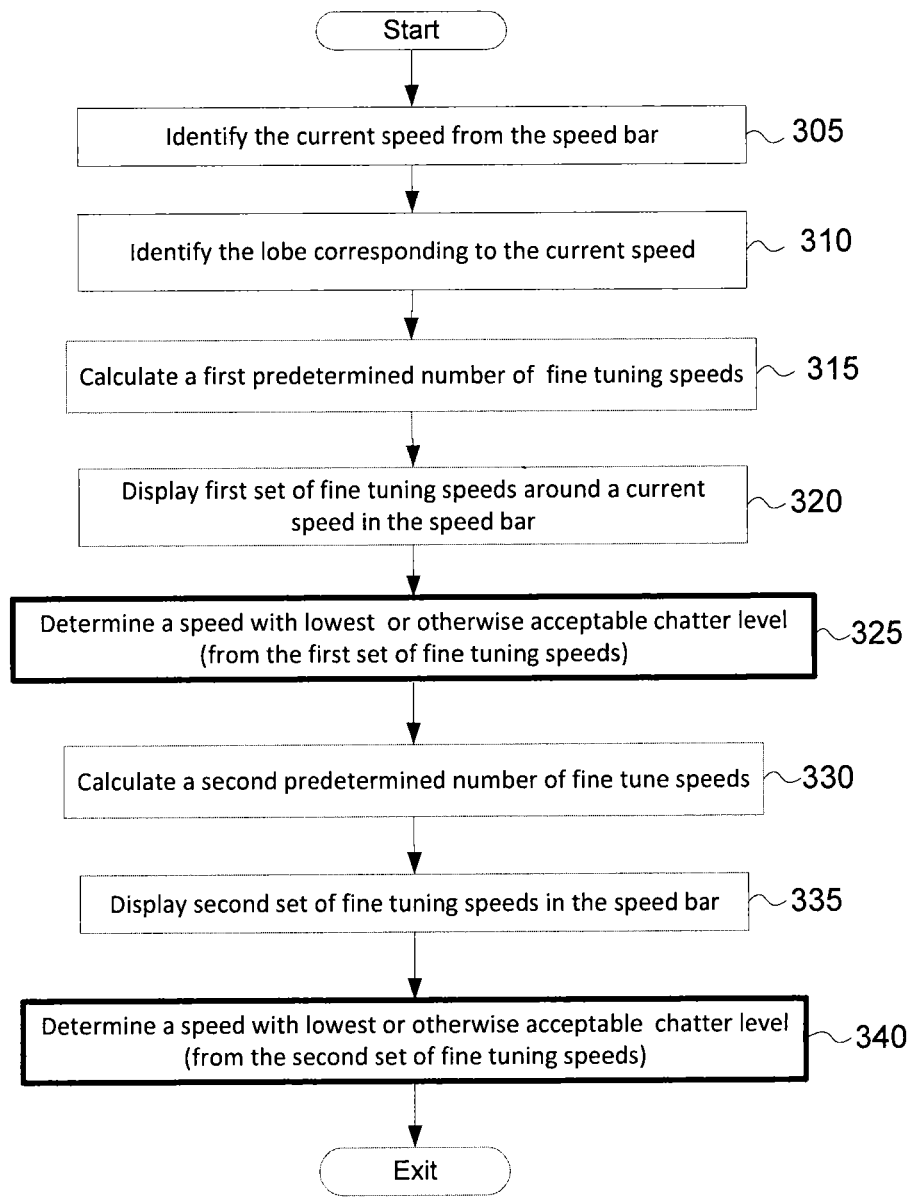
FIGS. 3A-3B depict flow charts of a fine-tuning speed method according to one embodiment.
Figure 3B:
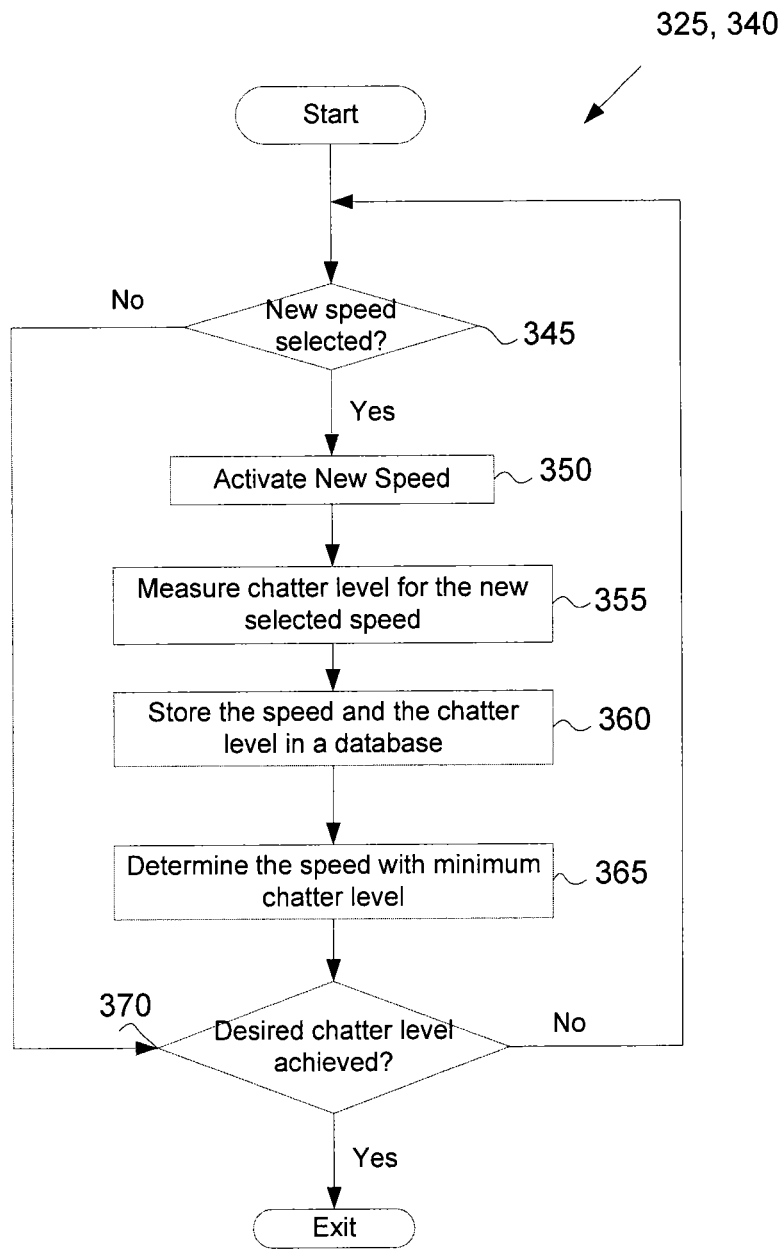

In step 300, one or more fine-tuning speeds are generated around a predetermined rotation speed and, depending on the embodiment, displayed within the speed bar. The predetermined rotation speed may be an initial speed set in the NC program or by an operator. In one embodiment, the predetermined rotation speed is chosen from one of the candidate speeds calculated using the stable speed method, for example using equation 1 below. FIG. 3A is primarily described using the current speed as an example. However, the method described in FIG. 3A is equally applicable to the other predetermined rotation speeds described above. An embodiment of the fine-tuning process is illustrated in FIGS. 3A and 3B and further discussed below. After the fining-tuning is performed, the process optionally continues to the data collection steps 203c.

The history bar 220 displays history data associated with previously selected and current selected speeds along a speed axis. The history data is extracted from the speed and the chatter databases, which are populated using step 210c.

In one embodiment, the original speed bar is modified to further display fine-tuning speeds to further reduce the chatter. In another embodiment, automatic fine-tuning is performed with or without modifying the original speed bar display. FIGS. 3A and 3B illustrate exemplary methods for fine-tune speed control of the chatter levels during one or more machining operations. The method is iterative in nature and generates fine-tuning speeds in multiple steps until a minimum (or otherwise acceptable) chatter level is achieved. As noted above, the fine-tuning speeds may or may not be displayed on the speed bar. In certain embodiments, the fine-tuning speeds are displayed separately from the speed bar.

In step 305, the current speed, or another predetermined machine speed, is identified from a speed bar generated in the process illustrated in FIG. 2B. In one embodiment, the current speed is stored in a machine's controller in order to control the spindle speed as required. As described above, the speed bar not only displays the candidate speeds, but also displays one or a combination of a current speed, initial speed, and previously selected speeds to reduce chatter.

In step 310, the lobe corresponding to the current speed, or another predetermined machine speed, is identified. For example, the lobe number is determined from the data used to generate the speed bar or can be calculated using equation 2 as discussed earlier. Generally, a lobe number indicates a particular stability lobe in a stability lobe diagram of a particular machine/tool/machining condition combination and the stability lobe is further associated with a range of speeds. The stability lobe diagrams can be predetermined for particular machine conditions and stored in a database.

In certain embodiments, a stability lobe diagram may be generated or an existing stability lobe diagram may be updated based on the machining data collected during the machining operation. A stability lobe diagram can be generated in multiple ways by including an analytical approach (e.g., using equations 1-3), experimental approach, from past chatter data collected during a machining process, computer simulations and a combination thereof. Further, in certain embodiments, multiple stability lobe diagrams can be generated during the machining process as the dynamic condition changes and different chatter frequencies are observed for the same speeds. These stability lobe diagrams can be combined (e.g., in the case of updating) using simple averaging, weighted averaging, or other statistical techniques and then used to calculate one or more optimal speeds.

To calculate the optimal (or otherwise acceptable) speed in the present embodiment, in step 315, a stability lobe corresponding to the current speed (or any other selected speed) is determined. The stability lobe may be identified automatically or manually by a user via a user input. One or a combination of different methods may be utilized to calculate fine-tuning speeds, including using an arithmetic progression or harmonic progression, which are described in further detail below. For example, one method may be used to calculate a first set of fine-tuning speeds and the same, a different method, may be used to calculate a second set of fine-tuning speeds. Further, one or more additional sets of fine-tuning speeds may calculated in certain embodiments. In certain embodiments, the fine-tuning speeds may range across multiple lobes (e.g., two adjacent lobes).

In one embodiment, when using the arithmetic progression method, a width of the determined stability lobe, for which fine-tuning speeds are to be calculated, is used to calculate the spacing between fine-tuning speeds within the respective stability lobe. A set of fine-tuning speeds is selected such that each fine-tuning speed is separated based on the calculated spacing. In another embodiment, when using the arithmetic progression method, the range of machine speeds is designated by the user, instead of being based on the width of the stability lobe, and the first set of fine-tuning speeds is selected from the range of speeds according to dividing points of the designated range. In another embodiment, when using the harmonic progression method, the base speed and a lobe number of the determined stability lobe, for which fine-tuning speeds are to be calculated, is used to select the set of fine-tuning speeds. Examples of the arithmetic and harmonic progression methods are described below with respect to FIGS. 6-7 and 8-9, respectively.

In one embodiment, when using the arithmetic progression method, the first set of fine-tuning speeds may be predetermined using equations 1 and 3, starting with the base speed calculation. Further, for each lobe number, a stable speed can be calculated which in turn can be used to calculate a speed range for each lobe number. A first spacing between the speeds is determined by dividing the determined speed range by a first predetermined number (e.g., 10). Then a first set of fine-tuning speeds is selected from the range of machine speeds with the current speed at the center.

In one embodiment, each of the first set of fine-tuning speeds is separated by, or otherwise based on, the first spacing. Further, in one embodiment, each fine-tuning speed in the first set of fine-tuning speeds is equally spaced. The 10 speeds act as the first set of fine-tuning speeds and, depending on the embodiment, are displayed on the speed bar along with the current speed, in step 320.

Normally, the lobe width separates stable speeds. However, when multiple chatter frequencies exist, the stable speed region may be impinged by the lobe of another frequency. Also, dynamic machine characteristics may affect the accuracy of the stable speed prediction.

In step 325, a determination is made as to which of the first set of fine-tuning speeds has the lowest chatter level or is otherwise acceptable. In one embodiment, each of the first set of fine-tuning speeds is scanned to automatically determine which of the first set of fine-tuning speeds corresponds to a lowest chatter value. For example, the machine is operated at each of the first set of fine-tuning speeds, chatter levels are measured at each of the operating speeds, and the lowest chatter value is selected from the measured chatter levels. In another embodiment, the machine is operated at only a subset of the first set of fine-tuning speeds, for example until a speed with a chatter level below a predetermined threshold is identified. In another embodiment, an operator selects one or more different fine-tuning speeds displayed in the speed bar until a speed with minimized (or otherwise acceptable) chatter is selected. For example, the chatter levels for each of the selected one or more different fine-tuning speeds is measured and displayed in the speed bar to the operator. The selected one of the first set of fine-tuning speeds becomes the current speed.

Step 325 is a sub-process, illustrated in FIG. 3B and discussed later. Further, in step 330, the speed range of the stability lobe corresponding to the selected fine-tuning speed (selected in step 325) is divided into a second predetermined number (e.g., 40) of parts (speeds) to generate a second set of fine-tuning speeds. For example, when using the arithmetic progression, a second spacing is determined by dividing the determined lobe width by the second predetermined number. Then the second set of fine-tuning speeds is selected from the range of machine speeds. In one embodiment, each of the second set of fine-tuning speeds is separated by, or otherwise based on, the second spacing. Further, in one embodiment, the second set of fine-tuning speeds are equally spaced.

As noted above, in certain embodiments, the second set of fine-tuning speeds is selected only from a subset of the speed range of the stability lobe. For example, the second set of fine-tuning speeds is selected from the speed range of the stability lobe that falls between two of the first set of fine-tuning speeds, such as the two of the first set of fine-tuning speeds neighboring the current speed, the current speed and one of the first set of fine-tuning speeds neighboring the current speed, etc.

In certain embodiments, the first predetermined number is less than the second predetermined number. The larger spacing associated with the first predetermined number allows, for example, for efficient scanning of one full lobe width. Once the lowest value, or an otherwise acceptable value is found, the smaller spacing associated with the second predetermined number can be used for pinpointing. Thus, a finer speed resolution can be obtained to pinpoint a speed that will minimize the chatter level further. However, in other embodiments the first predetermined number may be greater than or equal to the second predetermined number.

The second set of fine-tuning speeds is optionally displayed on the speed bar along with the current speed, in step 335. For example, the second set of fine-tuning speeds may not be displayed when an optimal one of the second set of fine-tuning speeds is automatically determined. However, the second set of fine-tuning speeds are displayed to the user in the case of manual selection or another embodiment of the automatic determination.

In step 340, a determination is made as to which of the second set of fine-tuning speeds has the lowest chatter level or is otherwise acceptable. In one embodiment, each of the second set of fine-tuning speeds is scanned to automatically determine which of the second set of fine-tuning speeds corresponds to a lowest chatter value. For example, the machine is operated at each of the second set of fine-tuning speeds, chatter levels are measured at each of the operating speeds, and the lowest chatter value is selected from the measured chatter levels. In another embodiment, the machine is operated at only a subset of the second set of fine-tuning speeds, for example until a speed with a chatter level below a predetermined threshold is identified. In another embodiment, an operator selects one or more different fine-tuning speeds from the second set of fine-tuning speeds, for example displayed in the speed bar, until a speed with minimized (or otherwise acceptable) chatter is selected. For example, the chatter levels for each of the selected one or more different fine-tuning speeds is measured and displayed in the speed bar to the operator. The selected one of the second set of fine-tuning speeds then becomes the current speed.

As described above, the division of the speed range, associated with the stability lobe of the current speed and/or the adjacent lobes, into a first predetermined number (e.g., 10) can be performed in different ways. In one embodiment, 10 speeds may be obtained by dividing the speed range in to 10 equal parts (i.e., using an arithmetic progression). For example, consider initial conditions as follows: a cutting tool with 3 cutting edges ("flutes"), the minimum and maximum allowable speeds are 10000 rpm and 20000 rpm respectively. The machining process begins and the measured chatter frequency is 1800 hertz.

Based on the initial condition, the base speed can be calculated using equation 3 as follows:

Base Speed=Chatter Frequency*60/cutting edges=1800*60/3=36000 rpm.

Further, stable lobe speeds can be calculated using equation 1 as follows:

Lobe 1 speed=Base Speed/1=36000 rpm

Lobe 2 speed=Base Speed/2=18000 rpm

Lobe 3 speed=Base Speed/3=12000 rpm

Lobe 4 speed=Base Speed/4=9000 rpm

The lobe N speed range is from the lobe N+1 speed to the lobe N speed. For example, the lobe 3 speed range is from the lobe 4 speed to the lobe 3 speed, numerically from 9000 rpm to 12000 rpm. Then, the allowable tools speeds in the example span lobe 1 to lobe 4 according to the minimum and maximum speed criteria. Note that each of the lobes has a different width, and the width increases as lobe number decreases. Tables 1 and 2 below illustrate exemplary lobe speeds calculated using equation 1. Table 2 includes more stable speeds for the same chatter conditions as Table 1. The additional speeds become available when the tool speed restrictions are relaxed.

TABLE 1

Calculated non-chatter speeds

| Chatter Freq | Flute Count | Base Speed |
|---|---|---|
| 1800 | 3 | 36000 |
| | Min Speed | Max Speed |
| | 10000 | 20000 |

| Lobe No | Speeds |
|---|---|
| 4 | <Min Speed |
| 3 | 12000 |
| 2 | 18000 |
| 1 | >Max Speed |

TABLE 2

Additional calculated non-chatter speeds

| Chatter Freq | Flute Count | Base Speed |
|---|---|---|
| 1800 | 3 | 36000 |
| | Min Speed | Max Speed |
| | 5000 | 40000 |

| Lobe No | Speeds |
|---|---|
| 8 | <Min Speed |
| 7 | 5143 |
| 6 | 6000 |
| 5 | 7200 |
| 4 | 9000 |
| 3 | 12000 |
| 2 | 18000 |
| 1 | 36000 |

Based on the lobe speeds, the fine-tuning spacing within one lobe width can be calculated by dividing the speed range corresponding to the lobe width by a first predetermined number (e.g., 10). For example, the spacing for lobe 3 is (Lobe 3 speed−Lobe 4 speed)/10=(12000−9000)/10=300 rpm. Similarly, the spacing for lobe 2 is (18000−12000)/10=600 rpm, and the spacing for lobe 1 is (36000−18000)/10=1800 rpm. The spacing for each lobe is further used to calculate, the fine-tuning speeds. For example, when a tool's entire speed range is 10000 to 20000 rpm, the fine-tuning speeds that fall within the minimum and maximum speeds criteria in one example include 10200, 10500, 10800, 11100, 11400, 11700, 12000, 12600, 13200, 13800, 14400, 15000, 15600, 16200, 16800, 17400, 18000, and 19800. The fine-tuning speed calculation for arithmetic progression between lobes 4 and 3, with two cross boundary speeds also included, is presented in Table 3.

TABLE 3

Sample fine-tuning speed calculation using arithmetic progression

| Chatter Freq | Flute Count | Base Speed |
|---|---|---|
| 1800 | 3 | 36000 |
| Lobe No | Fine Tune Step | Fine Tune Speeds |
| 4 | — | 9000 |
| — | +300 | 9300 |
| — | +300 | 9600 |
| — | +300 | 9900 |
| — | +300 | 10200 |
| — | +300 | 10500 |
| — | +300 | 10800 |
| — | +300 | 11100 |
| — | +300 | 11400 |
| — | +300 | 11700 |
| 3 | +300 | 12000 |
| — | +600 | 12600 |
| — | +600 | 13200 |

Further, if desired, the minimum and maximum speed, 10000 rpm and 20000 rpm respectively, may be added to the first set of fine tuning speeds even though in this example they do not correspond to a calculated fine-tune speed. The advantage of the arithmetic progression method is that spacing is based on lobe width, so as lobe width increases, fine-tune speed step size increases, making search for good speeds more efficient. On the other hand, the disadvantage may be that there is a big jump at the lobe border speeds. For example, at 18000 rpm, speed step changes from 600 rpm to 1800 rpm.

In another embodiment, a harmonic progression method may be used to calculate the fine-tuning speeds. The harmonic progression method, according to an embodiment of present disclosure, enjoys the advantage of the arithmetic progression method but eliminates some of its disadvantage. The harmonic progression method is defined as the progression of reciprocals of an arithmetic progression. The starting arithmetic progression is N/BaseSpeed, (N−0.1)/BaseSpeed, (N−0.2)/BaseSpeed, (N−0.3)/BaseSpeed, etc. Then the reciprocal of each element individually becomes the fine tune speed. In the harmonic progression method, not only the lobe speeds (e.g., corresponding to the candidate speeds), but all fine tune speeds can be calculated using the base speed. For example between Lobe 4 and Lobe 3, divide Base Speed by 4, 3.9, 3.8, 3.7, 3.6, 3.5, 3.4, 3.3, 3.2, 3.1, 3.0 to get the fine-tuning speeds. This will space 10 fine tune speeds in a harmonic progression across the stability lobe, matching the harmonic characteristic of actual stability lobes. Fine-tune speed steps will get larger as spindle speed increases, and there will be no jump at the lobe boundaries. An example of actual speed calculation results for tool's full speed range is: 10000, 10286, 10588, 10909, 11250, 11613, 12000, 12414, 12857, 13333, 13846, 14400, 15000, 15652, 16364, 17143, 18000, 18947, 20000. In certain cases, any speeds corresponding to a non-integer value may be rounded to the closest integer value. The fine-tuning speed calculation for harmonic progression between lobes 4 and 3, with two cross boundary speeds also included, is presented in Table 4 below.

TABLE 4

Sample fine-tuning speed calculation using harmonic progression

| Chatter Freq | Flute Count | Base Speed |
|---|---|---|
| 1800 | 3 | 36000 |
| Lobe No | Denominator | Fine Tune Speeds |
| 4 | 4 | 9000 |
| — | 3.9 | 9231 |
| — | 3.8 | 9474 |
| — | 3.7 | 9730 |
| — | 3.6 | 10000 |
| — | 3.5 | 10286 |
| — | 3.4 | 10588 |
| — | 3.3 | 10909 |
| — | 3.2 | 11250 |
| — | 3.1 | 11613 |
| 3 | 3 | 12000 |
| — | 2.9 | 12414 |
| — | 2.8 | 12857 |

In another embodiment a statistical distribution such as a normal distribution or Gaussian distribution may be fitted around the current speed and 10 speeds may be selected from the speed range based on the standard deviation (denoted as sigma) or variation calculations. For instance, speeds within a six sigma distance about the current speed can be selected (e.g., the end points can be defined by (current speed−3*sigma) and (current speed+3*sigma)). In this case it is not necessary to calculate the end points of the stability lobe. Variation of the speed between the current speed lobe or adjacent lobes can be predetermined from the historic data.

In another embodiment, a weighted speed method may be implemented, where a higher weightage is assigned to speeds closer to the current speed and lower weightage is assigned to speeds further away from the current speed. In one embodiment, a higher weightage can be given to speeds close to the stability speeds. Further, the first or second set of fine tuning speeds can be selected based on the weightage. The pre-weighted speeds around the current speed themselves can be calculated based on one or a combination of the arithmetic progression method, harmonic method or other statistical methods, as discussed above. In another embodiment, historic data may be used along with any of the above mentioned speed division method. For instance, if any of the 10 speeds is close (say less than 5%) to a tried speed, then that speed may be omitted and replaced with the tried speed. A similar approach can be followed to determine the second set of speeds by dividing the speed range into second predetermined number (e.g., 40).

In one embodiment, steps 325 or 340 is a sub-process, which is illustrated in FIG. 3B in further detail, in which an operator, or an automated fine-tuning process, may select and activate new speeds until a speed with minimum (or otherwise acceptable) chatter is determined. The desired range of chatter level could be set from zero to a chatter threshold level or from zero to a chatter level corresponding to the critical depth of cut (line 520 in FIG. 5). If an operator or the automated fine-tuning process is determined to have selected a new speed, in step 345, then the new speed is activated in step 350.

Speed activation by the operator may be implemented in various ways. For instance, in one embodiment of the present disclosure, the operator can drag the button upwards and release it in that position. A different speed activation method can be adopted as well. For example, the desired speed may be activated by multiple taps, holding and dragging a button in one or more predetermined directions (e.g., sideways), etc. In case of an analog implementation, switches or rotating dials may be provided to activate a desired speed. The interface may also be a combination of digital and analog parts.

Once the selected fine-tuning speed is activated, a chatter level corresponding to the current speed is measured, in step 355. The current speed and the measured chatter level are stored in the database, in step 360. The data stored is then used to determine the speed with minimum or an otherwise acceptable chatter level, step 365. If the desired chatter level is determined not to be achieved, in step 370, then a new speed is selected, step 345 and the process continues. If the desired chatter level is achieved, in step 370, then the sub-process 325 (or 340) exits and continues to the next step within process illustrated in FIG. 3A. The next step in the process illustrated in FIG. 3A could be step 330, if sub-process 325 is invoked after step 320 or the next step could be exit, if sub-process 340 is invoked after step 335.

In one embodiment, optional step 370 involves providing a visual or other indication to the user about whether the desired chatter level has been achieved. The indications may be triggered based on historical data. For example, the current chatter level may be compared with the historical chatter data related to tried speeds that are within 5% of the current speed and if the difference between the current chatter and the historic chatter is less than a certain percentage (e.g., 10%), then a message indicating "an acceptable chatter level has been achieved" may be displayed. However, if the historic data indicates a lower chatter level may be achieved, the interface may prompt the user to select a new speed. In another embodiment, the desired chatter level is determined to be achieved when no further speed is selected. Alternatively, a lowest achievable chatter threshold may be set, which will trigger an indicator to stop the fine-tuning process. The lowest achievable chatter threshold may be determined based on the historic data collected during the different machining processes performed during the lifecycle of the machine.

Depending on the embodiment, step 370 may be performed automatically or based on one or more user inputs. For example, whether the desired chatter level has been achieved is determined based on a comparison with a predetermined threshold. In certain embodiments, the determination in step 370 is performed only after a predetermined number of a set of fine-tuning speeds has been selected. For example, the determination of the speed with minimum chatter level is performed after chatter levels have been measured for a predetermined subset or all fine-tuning speeds within the first or second set of fine-tuning speeds.

One or more of the steps in the sub-process 325 may be automated. In the automated process operator intervention may not be required. Fine-tuning speeds may be selected automatically by a computer implementing the process 325 based on a logic that involves comparing the chatter level with the threshold or past chatter level history of that tool. The comparison can be based on an error function calculating the difference between the current and past or set chatter levels.

Figure 4A:
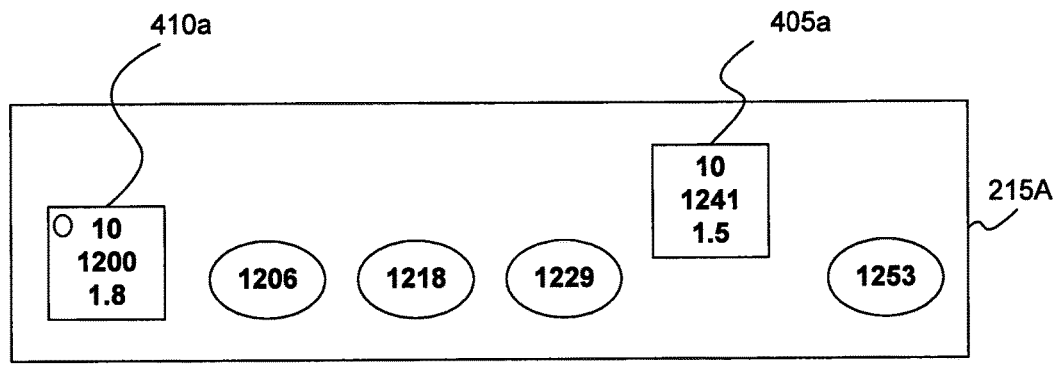
FIGS. 4A and 4B depict fine-tuning speed screens according to one embodiment.
Figure 4B:
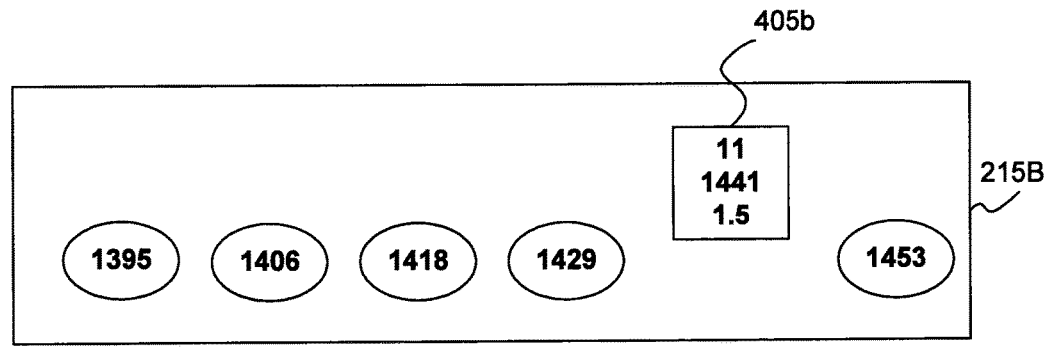

FIGS. 4A and 4B illustrate fine-tuning speed screens 215A, 215B according to one embodiment. The fine-tuning speed buttons are embedded in the fine-tuning speed screens 215A, 215B and are automatically added around the current speed as different speeds are selected, added in response to a user request, etc. Referring to FIG. 4A, the fine-tuning speeds are displayed as oval shaped buttons along with the current speed 405a, i.e. 1241 rpm for lobe number 10 with chatter level 1.5.

In one embodiment, one or more of the fine-tuning speeds generated by the process illustrated in FIG. 3A, or included in the stability lobe number to be fine-tuned, may include an initial speed or a previously tried speed. For instance, in FIG. 4A, the speed button 410a representing 1200 rpm is an initial speed and has a lobe number 10 with chatter level 1.8. Hence, the initial speed 410a is displayed in an initial speed format, i.e. a rectangular shaped button with a dot in the upper left corner of the rectangle. There are no other tried speeds within the displayed fine-tuning speed range. Note that the current speed 405a should be considered as a tried speed since it has been tried as a stable speed, and has the tried speed information of measured lobe number and chatter level.

Referring to FIG. 4B, the fine-tuning speeds are arranged in ascending order around the current speed 405b, i.e. 1441 rpm for lobe number 11 with chatter level 1.5. There are no tried speeds, except the current speed, within the displayed fine-tuning speed range. Further, other candidate speeds are pushed off the speed bar due to display space limitations.

Further, implementations of fine-tuning speeds are possible. The fine-tuning speeds may be implemented using different shapes and forms. Note, that the fine-tuning speed buttons are distinguished from the candidate speeds (e.g., stable speed, or predicted speeds of minimal chatter)—represented by the initial speed bar buttons. For example, a triangle shaped button or hexagonal shaped button may be used to identify the fine tuning speeds. Depending on the embodiment, the shape used for a fine-tuning speed does or does not change when that particular fine-tuning speed is selected. In one embodiment, the shape used for the fine-tuning speed changes to the shape of a candidate speed (e.g., a square), tried speed, or a different shape after the fine-tuning speed is selected. In another embodiment, the shape used for the fine-tuning speed does not change after it has been selected. In this case, a selected (or tried) fine-tuning speed may optionally be distinguished from an unselected (or not yet tried) fine-tuning speed based on the inclusion of additional information (e.g., measured chatter level, stability lobe number) or color coding in or around the shape associated with the fine-tuning speed. For example, the fine-tuning speed may initially be displayed with a white oval which is filled with a color after it has been selected. The color is based on the measured chatter level according to one embodiment. In another embodiment, the color is a predetermined color. Further, in certain embodiments, the display of fine-tuning speeds for different fine-tuning speed sets may be distinguished by shape, color, and/or other identifying or additional information. For example, a first set of fine-tuning speeds may be displayed using ovals, while a second set of fine-tuning speeds may be display using circles.

Figure 5A:
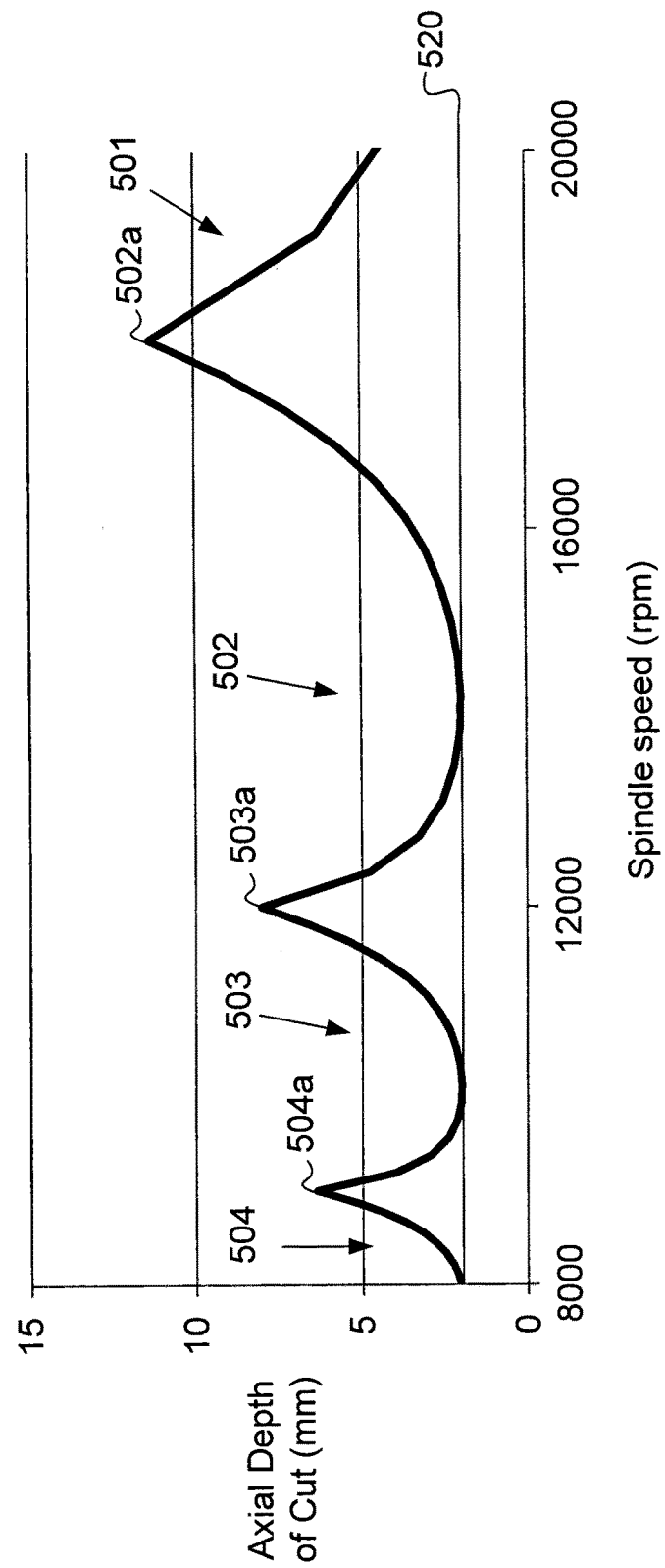
FIGS. 5A and 5B depict exemplary stability lobe diagrams according to one embodiment.
Figure 5B:
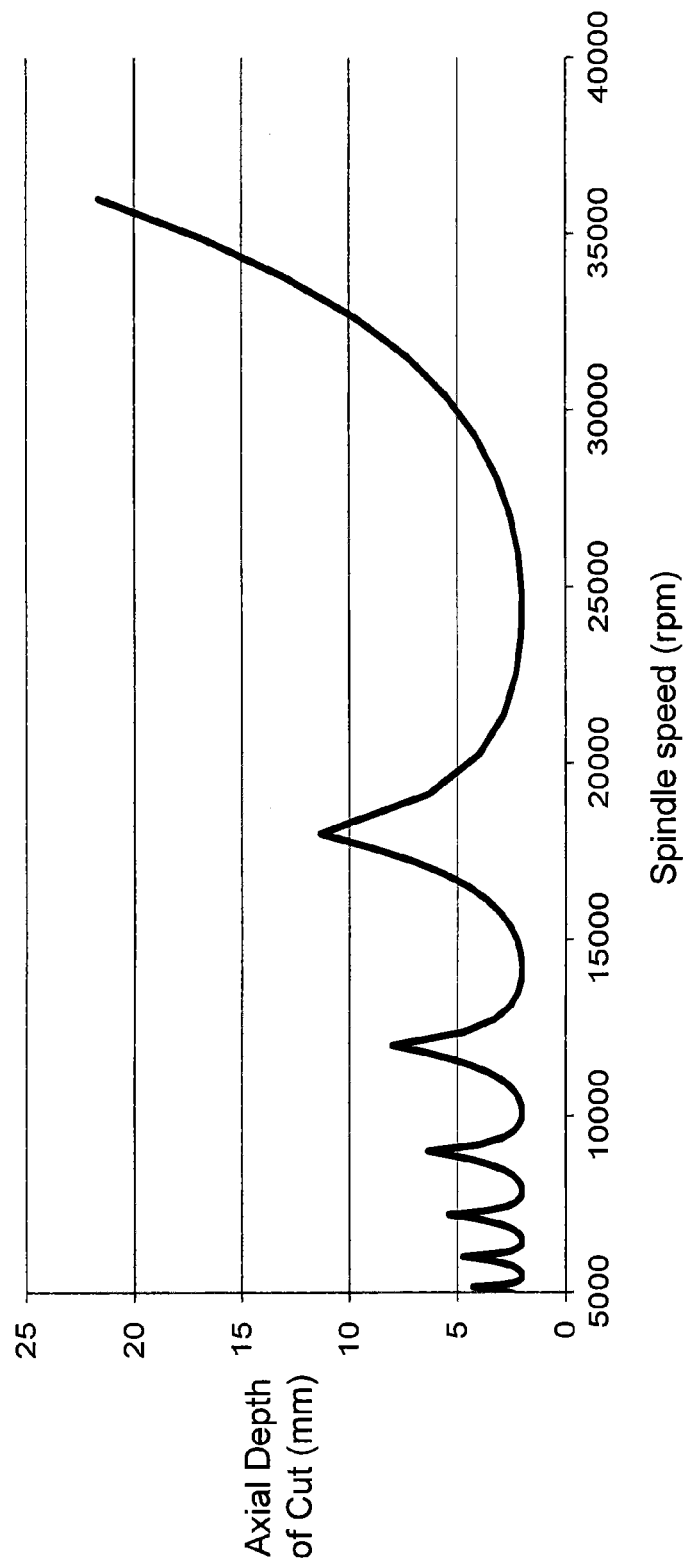

FIG. 5A depicts an exemplary stability lobe diagram upon which the fine tuning speed determination process is based according to certain embodiments. FIG. 5B is an extended stability lobe diagram with speeds ranging from 5000 to 40000, which encompass speeds beyond the minimum and maximum speed limits (e.g., 10000 and 20000) to enable fine tuning speeds calculations related to a different machining operations that may have a lower or higher machining speed requirements. The extended speed range is allowed by relaxing tool speed restrictions in one embodiment. Referring to FIG. 5A, the peaks of the stability curve represent local maxima of non-chatter depth of cut, at that spindle speed, which is termed a stable speed. The region between peaks is called a stability lobe. For example, stability lobes 1, 2, 3, 4, are represented by 501, 502, 503, and 504, respectively. The peaks 502a, 503a, and 504 are present the stable speeds associated with lobe 2, lobe 3, and lobe 4, respectively. The line 520 is the critical depth of cut, below which there is very low to no chatter for any given speed. Typically, a speed with minimum chatter and maximum depth of cut is desired.

As can be seen from the diagram, the width of the stability lobes vary, increasing width with increasing spindle speeds. Lobes populate sequentially from large lobe numbers to small lobe number across a given speed range from small speeds to large speeds. The harmonic nature of chatter magnitude repeats across the speed range, with peaks of minimum chatter at each of the lobe boundaries marked represented by peaks 502a, 503a and 504a. The width of each lobe increases as the speed range of a lobe increases. According to an embodiment of present disclosure, the fine tuning method accounts for the increasing width so that each fine tune speed step is an equal step when considering the harmonic nature of chatter itself. When referring to a single speed, boundaries between stability lobes are referred to using the higher lobe number. For example, the fifth to fourth lobe boundary is referred to as "lobe 5" (as opposed to calling it "lobe 4").

Figure 6A:
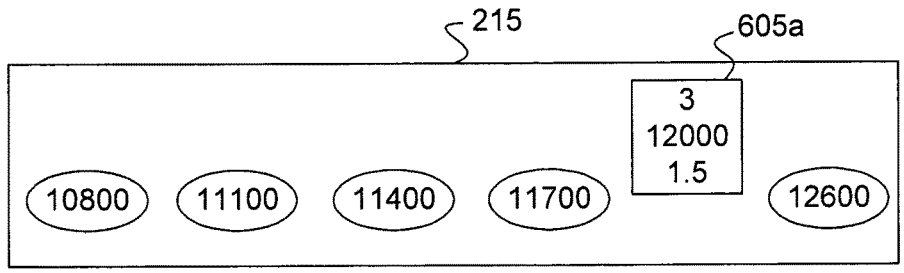
FIGS. 6A-6D illustrate exemplary selections of a first set of fine-tuning speeds calculated using an arithmetic progression method and included in the speed bar according to one embodiment.

FIGS. 6A-6D illustrate an exemplary interface display when different speeds from a first set of fine-tuning speeds, for example included in the speed bar, are selected according to one embodiment. In this illustration, the fine tuning speeds are calculated using the arithmetic progression method. Referring to FIG. 6A, the process 300 generates a first set of fine-tuning speeds which are displayed as shown. The generation and/or display of the fine-tuning speeds is performed in response to a user request (e.g., a fine-tuning or zoom request). The current speed 605a (12000 rpm) is a part of the original speed bar 215 that existed before starting the fine-tuning process and is used during the fine-tuning speed generation process. The current speed 605a is surrounded by the first set of fine-tuning speeds 10800, 11100, 11400, and 12600, respectively as calculated in Table 3. The remaining speeds may be made accessible via a scroll function.

Figure 6B:
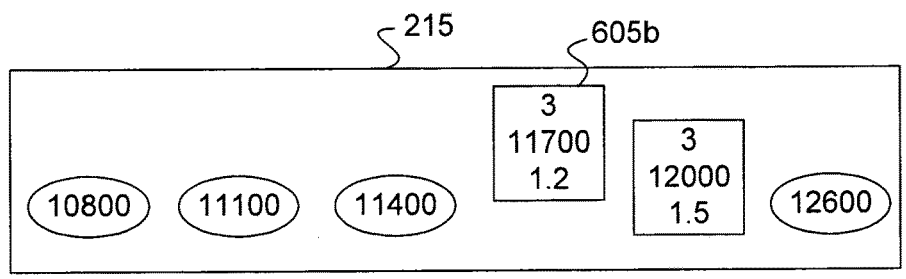

Referring to FIG. 6B, an operator has selected and activated the speed 11700 rpm. Hence the current speed 605b is 11700 rpm and the measured corresponding chatter level is 1.2 and the lobe number is 3, while the speed 12000 becomes a tried speed. Although the display of the fine-tuning speed 11700 changes from an oval shape to a square shape in FIG. 6B, it is noted that in another embodiment and as described above, the display of the fine-tuning speed 11700 remains as an oval shape such that, for example, the fine-tuning speed can be readily distinguished from a stable speed. Since the chatter level 1.2 is not in the desired range, the operator proceeds to activate speed 11400 rpm. The operator may also choose to select the new speed based on his experience operating machines. This activation may be made in response to a prompt displayed on the interface screen (e.g., "Please select another spindle speed").

Figure 6C:
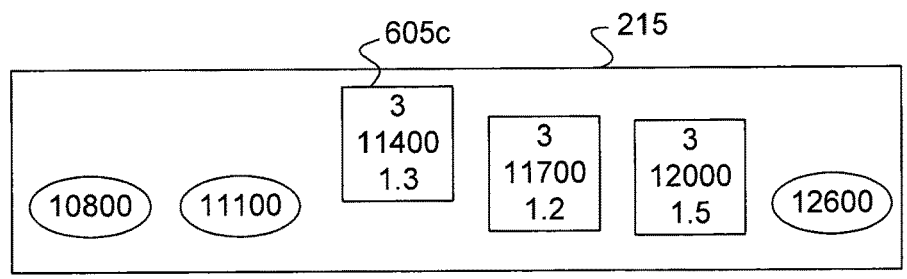

Referring to FIG. 6C, the current speed 605c is 11400 rpm and the corresponding chatter level is 1.3 and the lobe number is 3, while the speeds 11700 and 12000 represent the previously selected speeds. Since the current chatter level is not within the desired range, the operator activates another speed, 11100 rpm.

Figure 6D:
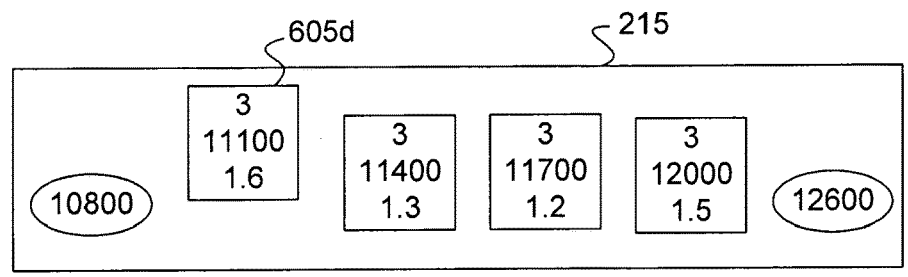
Figure 7A:
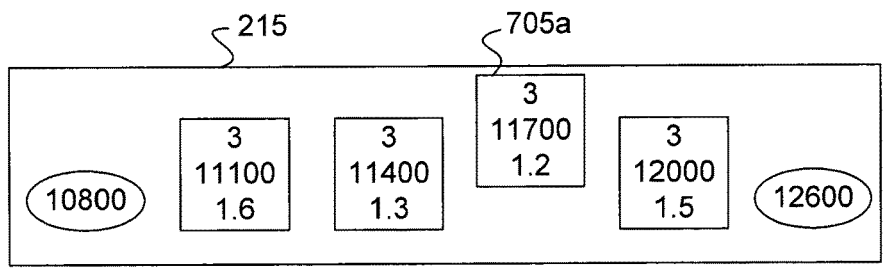
FIGS. 7A-7E illustrate exemplary selections of a second set of fine-tuning speeds calculated using the arithmetic progression method and included in the speed bar according to one embodiment.

Referring to FIG. 6D, the current speed 605d is 11100 and the corresponding chatter level is 1.6 and the lobe number is 3, while the speeds 11400, 11700, and 12000 represent the previously selected speeds. Since, the speed 11700 has the lowest chatter level among the displayed speeds the operator reactivates the speed 11700, as shown in FIG. 7A. However, the operator may decide to continue searching for speeds with lower chatter levels than 1.2 by, for example by selecting and/or scrolling to other fine-tuning speeds. The desired range of chatter level could be set from zero to a chatter threshold level or from zero to a chatter level corresponding to the critical depth of cut (line 520 in FIG. 5).

Figure 7B:
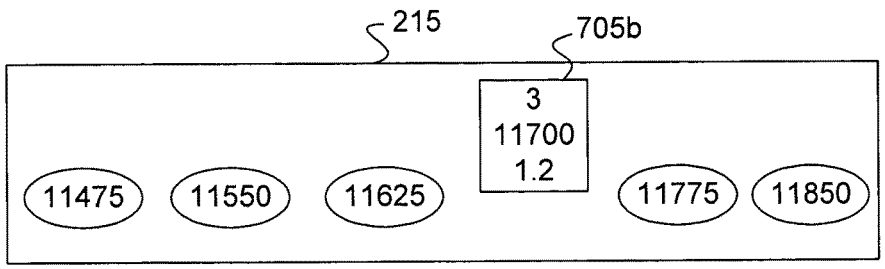
Figure 7C:
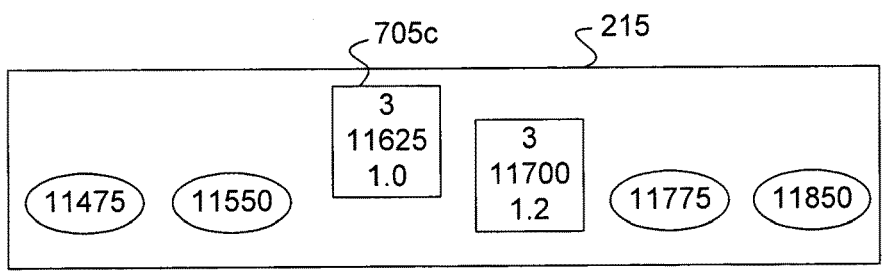
Figure 7D:
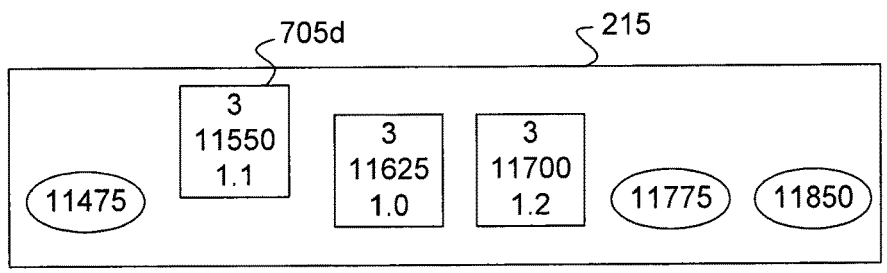

The fine-tuning process further generates more refined tuning speeds according to step 330 and displays them on the speed bar as shown in FIGS. 7B-7D. The generation and/or display of the more refined fine-tuning speeds may be performed in response to a user request (e.g., a fine-tuning or zoom request). These figures illustrate an exemplary interface displayed when different speeds from a second set of fine-tuning speeds, for example included in the speed bar, are selected according to one embodiment. The fine-tuning speeds are calculated by dividing the speed range of each of at least one stability lobe into a second predetermined number (e.g., 40) of parts. For example, when calculating a second set of fine-tuning speeds for stability lobes 2 and 3, the fine-tune step for lobe 2 would be (18000–12000)/40=6000/40=150 rpm. Similarly for lobe 3 the fine-tune step would be 75 rpm.

FIGS. 7B-7D illustrate the display of the second set of fine-tuning speeds that have higher resolution than the speeds in FIGS. 6A-6D. Referring to FIG. 7A, the current speed 705a is 11700 rpm with the corresponding lobe number 3 and the chatter level 01.2. While chatter level 1.2 is lower than that for the other speeds, additional fine-tuning is performed to find a further lower chatter speed, when desired, or to find the lowest possible chatter level for the displayed fine-tuning speeds. While populating the second set of fine tuning speeds, all the other tried speeds may be pushed off due to display space limitations and replaced by second set of speeds.

Referring to FIG. 7B, the current speed 705b is 11700 rpm and the chatter level measured is 1.2, the tried speeds 11100, 11400, and 12000 are pushed off due to display space limitations and replaced with speeds 11475, 11550, 11625, 11775 and 11850. In order to further reduce the chatter, the operator tries the speed 11625 rpm.

Referring to FIG. 7C, the current speed 705c becomes 11625 rpm and the chatter level measured is 1.0, while speed 11700 rpm becomes a tried speed. Although the display of the fine-tuning speed 11625 changes from an oval shape to a square shape in FIG. 7C, it is noted that in another embodiment and as described above, the display of the fine-tuning speed 11625 remains as an oval shape such that, for example, the fine-tuning speed can be readily distinguished from a stable speed. Further, in certain embodiments, the display of fine-tuning speeds for different fine-tuning speed sets may be distinguished by shape, color, and/or other identifying information The chatter level is lower than the previously tried speeds; and the operator further decides to try the speed 11550 rpm.

Figure 7E:
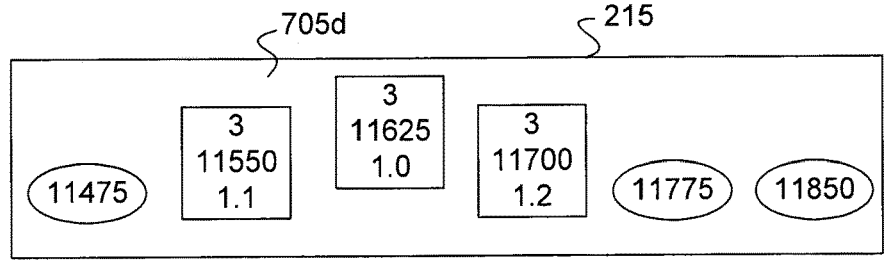

Referring to FIG. 7D, the current speed 705d becomes 11550 rpm and the chatter level measured is 1.1, while speed 11625 rpm becomes a tried speed. Based on the history of selected speeds and the corresponding chatter level, the operator can readily recognize a minimum chatter level of 1.0 is reached at speed 11625 and decides to reactivate the speed 11625 rpm as illustrated in FIG. 7E. However, the operator may decide to continue searching for speeds with lower chatter levels than 1.0 by, for example by selecting and/or scrolling to other fine-tuning speeds.

Figure 8A:
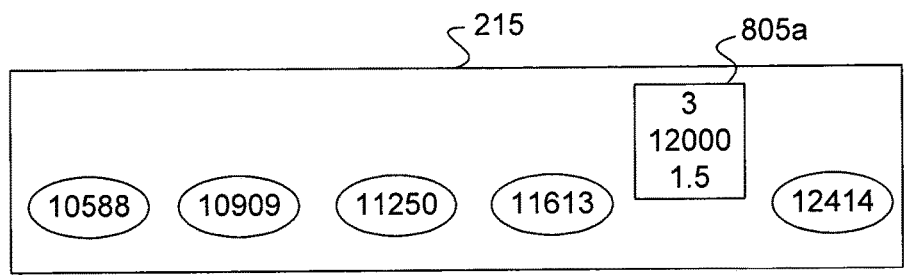
FIGS. 8A-8C illustrate exemplary selections of a first set of fine-tuning speeds calculated using a harmonic progression method and included in the speed bar according to one embodiment.
Figure 8B:
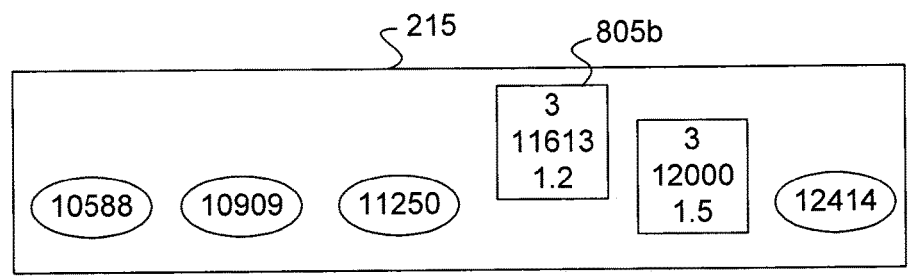
Figure 8C:
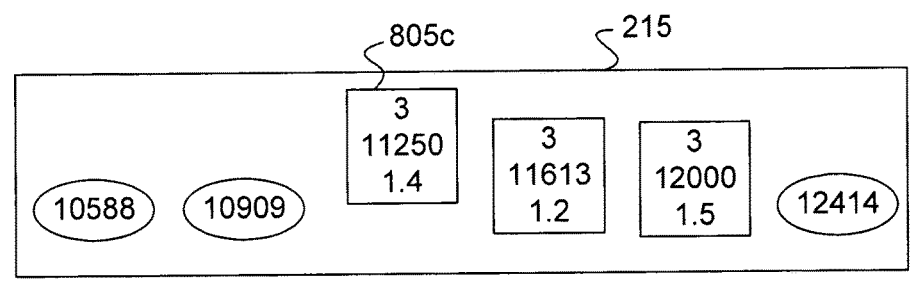

FIGS. 8A-8C illustrate an exemplary interface display when different speeds from a first set of fine-tuning speeds, for example included in the speed bar, are selected according to one embodiment. In these figures, the fine tuning speeds are calculated using the harmonic progression method. Referring to FIG. 8A, the process 300 generates a first set of fine-tuning speeds which are displayed as shown. The generation and/or display of the fine-tuning speeds is performed in response to a user request (e.g., a fine-tuning or zoom request). The current speed 805a (12000 rpm) is a part of the original speed bar 215 that existed before starting the fine-tuning process and is used during the fine-tuning speed generation process. The current speed 805a is surrounded by the first set of fine-tuning speeds 10588, 10909, 11250, 11613, and 12414 respectively as calculated in Table 4. The remaining speeds may be made accessible via a scroll function.

Referring to FIG. 8B, an operator has selected and activated the speed 11613 rpm. Hence the current speed 805b is 11613 rpm and the measured corresponding chatter level is 1.2 (note that initially the chatter level is not displayed and is only displayed after chatter specific sensor data is collected) and the lobe number is 3, while the speed 12000 becomes a tried speed. Although the display of the fine-tuning speed 11613 changes from an oval shape to a square shape in FIG. 8B, it is noted that in another embodiment and as described above, the display of the fine-tuning speed 11613 remains as an oval shape such that, for example, the fine-tuning speed can be readily distinguished from a stable speed. Since the chatter level 1.2 is not in the desired range, the operator proceeds to activate speed 11250 rpm. The operator may also choose to select the new speed based on his experience operating machines. This activation may be made in response to a prompt displayed on the interface screen (e.g., "Please select another spindle speed").

Figure 9A:
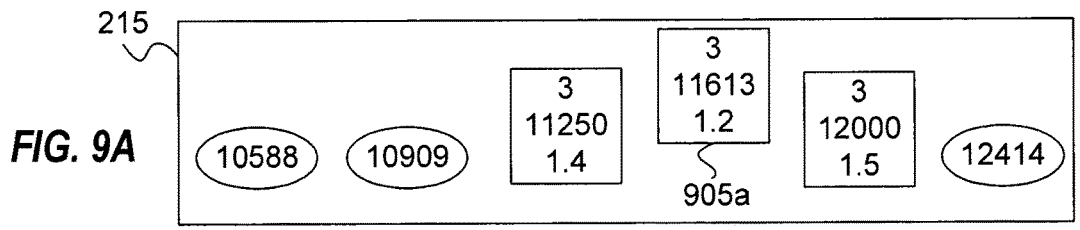
FIGS. 9A-9E illustrate exemplary selections of a second set of fine-tuning speeds calculated using the harmonic progression method and included in the speed bar according to one embodiment.

Referring to FIG. 8C, the current speed 805c is 11250 rpm and the corresponding chatter level is 1.4 and the lobe number is 3, while the speeds 11613 and 12000 represent the previously selected speeds. Since, the speed 11613 has the lowest chatter level among the displayed speeds the operator reactivates the speed 11613, as shown in FIG. 9A. However, the operator may decide to continue searching for speeds with lower chatter levels than 1.2 by, for example by selecting and/or scrolling to other fine-tuning speeds. The desired range of chatter level could be set from zero to a chatter threshold level or from zero to a chatter level corresponding to the critical depth of cut (e.g., line 520 in FIG. 5).

In one embodiment, the fine-tuning process further generates more refined tuning speeds according to step 330 and displays them on the speed bar as shown in FIGS. 9B-9E. The generation and/or display of the more refined fine-tuning speeds may be performed in response to a user request (e.g., a fine-tuning or zoom request). These figures illustrate an exemplary interface displayed when different speeds from a second set of fine-tuning speeds, for example included in the speed bar, are selected according to one embodiment. The fine tuning speeds are calculated using the harmonic progression method by which each lobe, for which further fine-tuning speeds are to be generated, is divided into a second predetermined number (40) parts. In one embodiment, the current speed or another selected speed will be the center of the second predetermined number of divisions per lobe of fine-tuning speeds.

For example, for a current speed 11613, the lobe number is 3.1 and each lobe number increment is 1/40 (0.025). Then, Base Speed is divided by 3.175, 3.15, 3.125, (3.1), 3.075, 3.05, etc., which gives fine tuning speeds 11339, 11429, 11520, (11613), 11707, 11803, etc.

FIGS. 9B-9E illustrate the display of the second set of fine-tuning speeds that have higher resolution than the speeds in FIGS. 8A-8C. Referring to FIG. 9A, the current speed 905a is 12000 rpm with the corresponding lobe number 3 and the chatter level 1.2 is selected. While chatter level 1.2 is lower than that for the other speeds, additional fine-tuning is performed to find a further lower chatter speed, when desired, or to find the lowest possible chatter level for the displayed fine-tuning speeds. While populating the second set of fine tuning speeds, all the other tried speeds may be pushed off the speed bar due to display space limitations and replaced by second set of speeds.

Figure 9B:
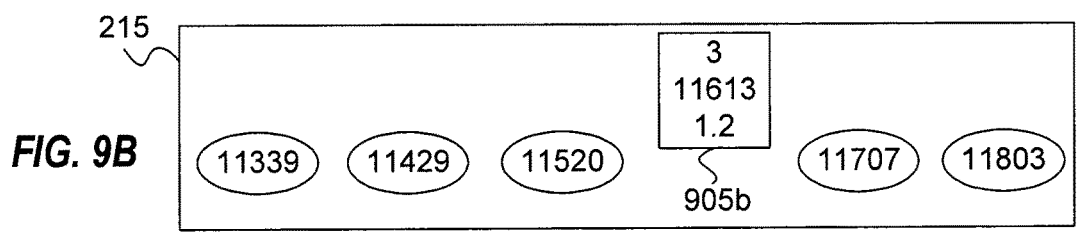
Figure 9C:
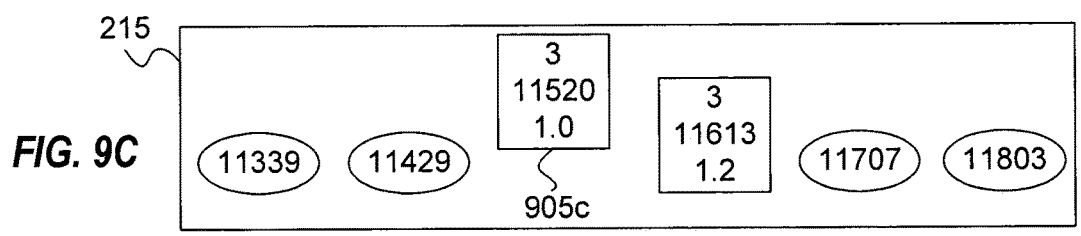

Referring to FIG. 9B, the current speed 905b is 11613 rpm and the chatter level measured is 1.2, the tried speeds 11250, 11613, and 12000 are omitted and populated with speeds 11339, 11429, 11520, 11707 and 11803. In order to further reduce the chatter, the operator tries the speed 11520 rpm Referring to FIG. 9C, the current speed 905c becomes 11520 rpm and the chatter level measured is 1.0, while speed 11613 rpm becomes a tried speed. Although the display of the fine-tuning speed 11520 changes from an oval shape to a square shape in FIG. 9C, it is noted that in another embodiment and as described above, the display of the fine-tuning speed 11520 remains as an oval shape such that, for example, the fine-tuning speed can be readily distinguished from a stable speed. Further, in certain embodiments, the display of fine-tuning speeds for different fine-tuning speed sets may be distinguished by shape, color, and/or other identifying information. The chatter level is lower than the previously tried speeds; the operator further decides to try the speed 11429 rpm.

Figure 9D:
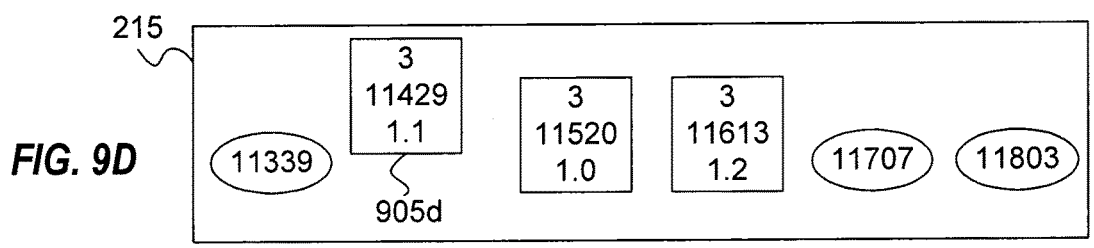
Figure 9E:
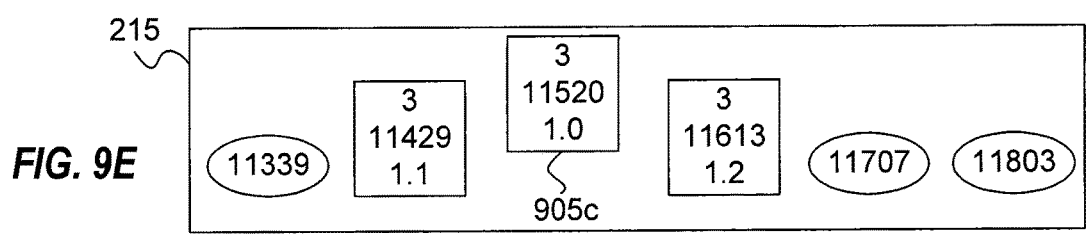

Referring to FIG. 9D, the current speed 905d becomes 11429 rpm and the chatter level measured is 1.1, while speed 11520 rpm becomes a tried speed. The operator can readily recognize a local minimum chatter level of 1.0 is reached at speed 11520 rpm and decides to reactivate the speed 11520 rpm as shown in FIG. 9E. However, the operator may decide to continue searching for speeds with lower chatter levels than 1.0 by, for example by selecting and/or scrolling to other fine-tuning speeds.

Although embodiments of the present disclosure have been described using two sets of fine-tuning speeds, only one fine-tuning speed set or more than two fine-tuning speed sets may be utilized in other embodiments. Further, although the above description primarily describes embodiments in which the fine-tuning speed sets are inserted in to a speed bar, for example, speed bar 215, it is noted that the fine-tuning speed sets may be displayed in a separate window (e.g., a pop-up window).

In certain embodiments, the pop-up window may only include speeds for a single lobe for which the fine-tuning speeds are calculated. The speeds may include only the fine-tuning speeds or also include any speeds corresponding to the lobe number that was previously calculated or selected.

In another embodiment, a zoom in and zoom out functionality may be implemented such that the fining-tuning speeds start appearing when zooming in and disappearing when zooming out. The zoom in or zoom out configuration focuses on a part of speed bar, such as the part focusing on the current speed or any other identified speed (e.g., a speed displayed in the center of the speed bar). In this case, fine-tune speeds may range across multiple lobes.

FIG. 10 illustrates a block diagram showing an example of a hardware configuration of a computer 1000 that is configured to implement one or more of the various processes described above. For example, in certain embodiments, the computer 1000 is configured to control the machine and/or to provide the CAI, including one or a combination of a chatter gauge element 201, a speed bar 215, a history bar 220, a vibration display element 225, and a speed database and a chatter database.

As illustrated in FIG. 10, the computer 1000 includes circuitry such as a central processing unit (CPU) 1002, read only memory (ROM) 1004, and a random access memory (RAM) 1006 interconnected to each other via one or more buses 1007. The one or more buses 1007 are further connected with an input-output interface 1010. The input-output interface 1010 is connected with an input portion 1012 formed by a keyboard, a mouse, a microphone, remote controller, touch screen, etc. The input-output interface 1010 is also connected to sensors like vibration sensors 105 and 106, via the input portion 1012 or communication portion 1018 for example. The input-output interface 1010 also connected to an output portion 1014 formed by an audio interface, video interface (e.g., to output for example displays like the chatter gauge element 201, speed bar 215, history bar 220, and vibration display element 225), speaker, etc.; a recording portion 1016 formed by a hard disk, a non-volatile memory, database etc.; a communication portion 1018 formed by a network interface, modem, USB interface, fire wire interface, etc.; and a drive 1020 for driving removable media 1022 such as a magnetic disk, an optical disk, a magneto-optical disk, a semiconductor memory, etc.

According to one embodiment, the CPU 1002 loads a program stored in the recording portion 1016 into the RAM 1006 via the input-output interface 1010 and the bus 1007, and then executes a program configured to implement the present disclosure such as providing the functionality of the one or combination of the elements of the CAI 200. The recording portion 1016 is for example a non-transitory computer-readable storage medium. It is noted that the term "non-transitory" is a limitation of the medium itself (i.e., tangible, not a signal) as opposed to a limitation on data storage persistency (e.g., RAM vs. ROM).

Figure 11:
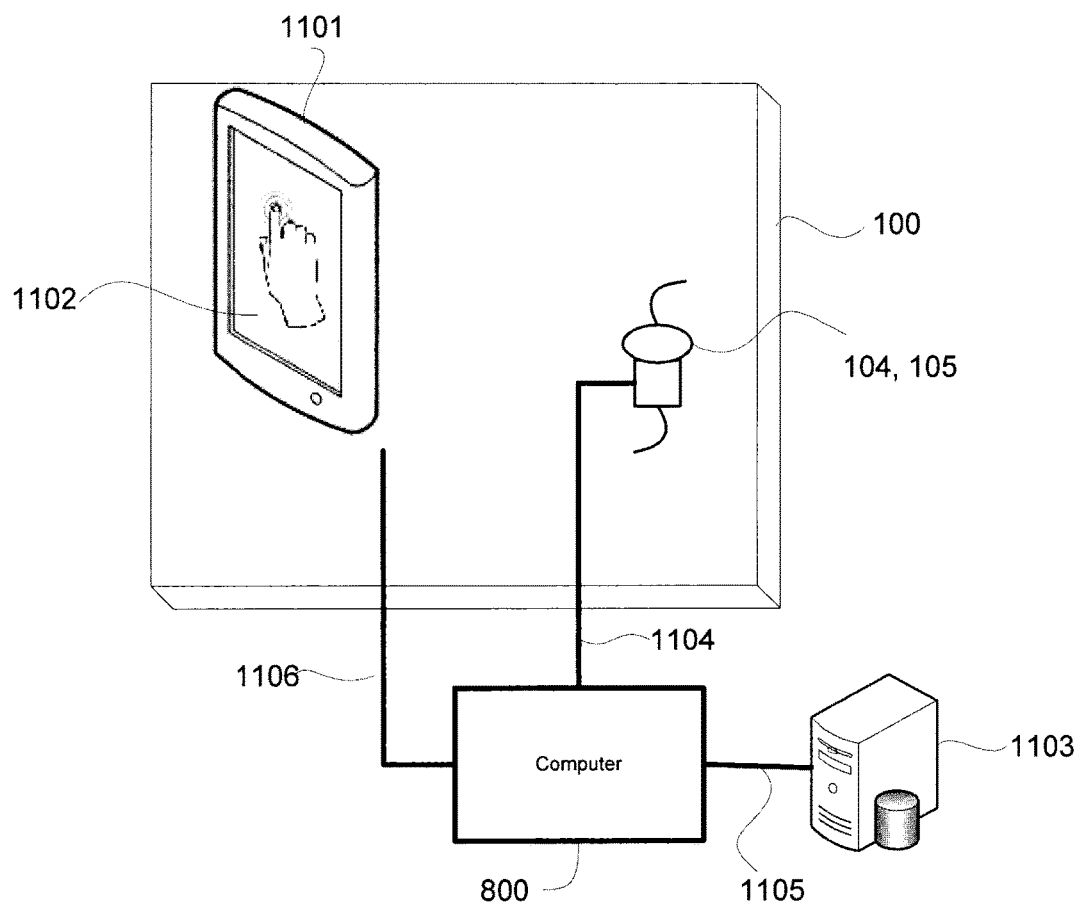
FIG. 11 depicts a system for implementing a fine-tuning speed interface according to one embodiment.

FIG. 11 is an exemplary system for implementing the CAI of the machine 100 discussed above. For example, one or a combination of the steps included in the flowcharts illustrated in FIGS. 2C, 3A and 3B may be implemented by the computer 1000. The interface is displayed on a device 1101, which includes a touch screen 1102. The device 1101 communicates with the computer 1000, which processes the information received from device 1101, and also information sent to the device 1101, via a communication link 1106, which interfaces with the communication portion 1018 of the computer 1000. The computer 1000 also receives information from the vibration sensors 104 and 105 via a communication link 1104, which interfaces with the communication portion 1018 of the computer 1000. The data processed by the computer 1000 is stored in the database 1103, which may be a part of the recording portion 1016, or connected via a communication link 1105, which interfaces with the communication portion 1018 of the computer 1000.

The various processes discussed above need not be processed chronologically or concurrently in the sequence depicted as flowcharts; the steps may also include those processed parallelly, serially, or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), displays etc.). All component elements may or may not be housed in a single enclosure. Therefore, a plurality of component elements each housed in a separate enclosure and connected via a network are considered a network, and a single component formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof. For example, this technology may be structured for cloud computing whereby a single function is shared and processed in collaboration among a plurality of apparatuses via a network.

The above disclosure also encompasses the embodiments noted below.

(1) A system, including circuitry configured to determine a predetermined speed of the machine; identify a stability lobe based on the predetermined speed of the machine; select a first set of fine-tuning speeds from a range of machine speeds corresponding to the determined stability lobe; and cause the machine to operate at one or more of the first set of fine-tuning speeds.

(2) The system according to feature (1), in which the circuitry is configured to determine the predetermined speed of the machine based on a current operating speed of the machine.

(3) The system according to features (1) or (2), in which the circuitry is configured to identify the stability lobe corresponding to the predetermined speed of the machine.

(4) The system according to any one of features (1) to (3), in which the circuitry is configured to: determine a lobe width of the identified stability lobe, the lobe width corresponding to the range of machine speeds; determine a first spacing by dividing the determined lobe width by a first predetermined number; and select the first set of fine-tuning speeds from the range of machine speeds, each of the first set of fine-tuning speeds being separated based on the first spacing.

(5) The system according to any one of features (1) to (4), wherein the circuitry is configured to: determine a base speed of the machine; and select the first set of fine-tuning speeds from the range of machine speeds based on the base speed and a lobe number of the identified stability lobe.

(6) The system according to feature (5), in which the circuitry is configured to: select each of N fine-tuning speeds included in the first set of fine-tuning speeds from the range of machine speeds using the following formula: base speed/(the lobe number of the identified stability lobe+m/a first predetermined number), where m is one of M consecutive integers that corresponds to the respective fine-tuning speed.

(7) The system according to feature (4), in which the circuitry is further configured to: determine a second spacing by dividing the determined lobe width by a second predetermined number; select a second set of fine-tuning speeds from the range of machine speeds, each of the second set of fine-tuning speeds being separated based on the second spacing; and cause the machine to operate at one or more of the second set of fine-tuning speeds.

(8) The system according to feature (6), in which the circuitry is further configured to: select each of N fine-tuning speeds included in a second set of fine-tuning speeds from the range of machine speeds using the following formula: base speed/(the lobe number of the identified stability lobe+n/a second predetermined number), where n is one of N consecutive integers that corresponds to the respective fine-tuning speed.

(9) The system according to any one of features (1) to (8), in which the circuitry is configured to: measure chatter levels when the machine operates at the first set of fine-tuning machine speeds, and automatically determine which of the first set of fine-tuning speeds corresponds to the lowest one of the measured chatter levels.

(10) A method of fine-tuning speed selection for reducing machine chatter, the method including: determining, by circuitry of a system, a predetermined speed of the machine; identifying, by the circuitry, a stability lobe based on the predetermined speed of the machine; selecting, by the circuitry, a first set of fine-tuning speeds from a range of machine speeds corresponding to the determined stability lobe; and causing the machine to operate at one or more of the first set of fine-tuning speeds.

(11) The method according to feature (10), in which the step determining includes determining the predetermined speed of the machine based on a current operating speed of the machine.

(12) The method according to feature (10) or (11), in which the step of identifying the stability lobe includes identifying the stability lobe corresponding to the predetermined speed of the machine.

(13) The method according to any one of features (10) to (12), in which the step of selecting includes: determining a lobe width of the identified stability lobe, the lobe width corresponding to the range of machine speeds; determining a first spacing by dividing the determined lobe width by a first predetermined number; and selecting the first set of fine-tuning speeds from the range of machine speeds, each of the first set of fine-tuning speeds being separated based on the first spacing.

(14) The method according to any one of features (10) to (13), in which the step of selecting includes: determining a base speed of the machine; and selecting the first set of fine-tuning speeds from the range of machine speeds based on the base speed and a lobe number of the identified stability lobe.

(15) The method according to feature (14), in which the step of selecting includes selecting each of M fine-tuning speeds included in the first set of fine-tuning speeds from the range of machine speeds using the following formula: base speed/(the lobe number of the identified stability lobe+m/a first predetermined number), where m is one of M consecutive integers that corresponds to the respective fine-tuning speed.

(16) The method according to feature (13), further including: determining a second spacing by dividing the determined lobe width by a second predetermined number; selecting a second set of fine-tuning speeds from the range of machine speeds, each of the second set of fine-tuning speeds being separated based on the second spacing; and causing the machine to operate at one or more of the second set of fine-tuning speeds.

(17) The method according to feature (15), further including selecting each of N fine-tuning speeds included in a second set of fine-tuning speeds from the range of machine speeds using the following formula: base speed/(the lobe number of the identified stability lobe+n/a second predetermined number), where n is one of N consecutive integers that corresponds to the respective fine-tuning speed.

(17) The method according to feature (15), further including selecting each of N fine-tuning speeds included in a second set of fine-tuning speeds from the range of machine speeds using the following formula: base speed/(the lobe number of the identified stability lobe+n/a second predetermined number), where n is a consecutive number that corresponds to the respective fine-tuning speed.

(18) The method according to any one of features (10) to (17), further including: measuring chatter levels when the machine operates at the first set of fine-tuning machine speeds, and automatically determining which of the first set of fine-tuning speeds corresponds to the lowest one of the measured chatter levels.

(19) A non-transitory computer-readable medium storing a program which when executed by a computer causes the computer to perform a method of fine-tuning speed selection for reducing machine chatter, the method including: determining a predetermined speed of the machine; identifying a stability lobe based on the predetermined speed of the machine; selecting a first set of fine-tuning speeds from a range of machine speeds corresponding to the determined stability lobe; and causing the machine to operate at one or more of the first set of fine-tuning speeds.

(20) The non-transitory computer-readable medium storing a program which when executed by a computer causes the computer to perform the method according to any one of features (11) to (18).

What is claimed is:

1. A system, comprising:
   circuitry configured to
     determine a predetermined speed of a machine;
     identify a stability lobe based on the predetermined speed of the machine;
     automatically select a first set of candidate fine-tuning speeds from a range of machine speeds corresponding to the determined stability lobe; and
     cause the machine to operate at one or more of the selected first set of candidate fine-tuning speeds.

2. The system according to claim 1, wherein the circuitry is configured to determine the predetermined speed of the machine based on a current operating speed of the machine.

3. The system according to claim 1, wherein the circuitry is configured to identify the stability lobe corresponding to the predetermined speed of the machine.

4. The system according to claim 1, wherein the circuitry is configured to:
   determine a lobe width of the identified stability lobe, the lobe width corresponding to the range of machine speeds;
   determine a first spacing by dividing the determined lobe width by a first predetermined number; and
   select the first set of candidate fine-tuning speeds from the range of machine speeds, each of the first set of candidate fine-tuning speeds being separated based on the first spacing.

5. The system according to claim 1, wherein the circuitry is configured to:
   determine a base speed of the machine; and
   select the first set of candidate fine-tuning speeds from the range of machine speeds based on the base speed and a lobe number of the identified stability lobe.

6. The system according to claim 5, wherein the circuitry is configured to:

select each of M fine-tuning speeds included in the first set of candidate fine-tuning speeds from the range of machine speeds using the following formula: base speed/(the lobe number of the identified stability lobe+ m/a first predetermined number), where m is one of M consecutive integers that corresponds to the respective fine-tuning speed.

7. The system according to claim 4, wherein the circuitry is further configured to:
determine a second spacing by dividing the determined lobe width by a second predetermined number;
select a second set of candidate fine-tuning speeds from the range of machine speeds, each of the second set of candidate fine-tuning speeds being separated based on the second spacing; and
cause the machine to operate at one or more of the second set of candidate fine-tuning speeds.

8. The system according to claim 6, wherein the circuitry is further configured to:
select each of N fine-tuning speeds included in a second set of candidate fine-tuning speeds from the range of machine speeds using the following formula: base speed/(the lobe number of the identified stability lobe+ n/a second predetermined number), where n is one of N consecutive integers that corresponds to the respective fine-tuning speed.

9. The system according to claim 1, wherein the circuitry is configured to:
measure chatter levels when the machine operates at the first set of candidate fine-tuning machine speeds, and
automatically determine which of the first set of candidate fine-tuning speeds corresponds to the lowest one of the measured chatter levels.

10. A method of fine-tuning speed selection for reducing machine chatter, the method comprising:
determining, by circuitry of a system, a predetermined speed of the machine;
identifying, by the circuitry, a stability lobe based on the predetermined speed of the machine;
automatically selecting, by the circuitry, a first set of candidate fine-tuning speeds from a range of machine speeds corresponding to the determined stability lobe; and
causing the machine to operate at one or more of the first set of candidate fine-tuning speeds.

11. The method according to claim 10, wherein the step determining comprises:
determining the predetermined speed of the machine based on a current operating speed of the machine.

12. The method according to claim 10, wherein the step of identifying the stability lobe comprises:
identifying the stability lobe corresponding to the predetermined speed of the machine.

13. The method according to claim 10, wherein the step of selecting comprises:
determining a lobe width of the identified stability lobe, the lobe width corresponding to the range of machine speeds;
determining a first spacing by dividing the determined lobe width by a first predetermined number; and
selecting the first set of candidate fine-tuning speeds from the range of machine speeds, each of the first set of candidate fine-tuning speeds being separated based on the first spacing.

14. The method according to claim 10, wherein the step of selecting comprises:

determining a base speed of the machine; and
selecting the first set of candidate fine-tuning speeds from the range of machine speeds based on the base speed and a lobe number of the identified stability lobe.

15. The method according to claim 14, wherein the step of selecting comprises:
selecting each of M fine-tuning speeds included in the first set of candidate fine-tuning speeds from the range of machine speeds using the following formula: base speed/(the lobe number of the identified stability lobe+ m/a first predetermined number), where m is one of M consecutive integers that corresponds to the respective fine-tuning speed.

16. The method according to claim 13, further comprising:
determining a second spacing by dividing the determined lobe width by a second predetermined number;
selecting a second set of candidate fine-tuning speeds from the range of machine speeds, each of the second set of candidate fine-tuning speeds being separated based on the second spacing; and
causing the machine to operate at one or more of the second set of candidate fine-tuning speeds.

17. The method according to claim 15, further comprising:
select each of N fine-tuning speeds included in a second set of candidate fine-tuning speeds from the range of machine speeds using the following formula: base speed/(the lobe number of the identified stability lobe+ n/a second predetermined number), where n is one of N consecutive integers that corresponds to the respective fine-tuning speed.

18. The method according to claim 10, further comprising:
measuring chatter levels when the machine operates at the first set of candidate fine-tuning machine speeds, and
automatically determining which of the first set of candidate fine-tuning speeds corresponds to the lowest one of the measured chatter levels.

19. A non-transitory computer-readable medium storing a program which when executed by a computer causes the computer to perform a method of fine-tuning speed selection for reducing machine chatter, the method comprising:
determining a predetermined speed of the machine;
identifying a stability lobe based on the predetermined speed of the machine;
automatically selecting a first set of candidate fine-tuning speeds from a range of machine speeds corresponding to the determined stability lobe; and
causing the machine to operate at one or more of the first set of candidate fine-tuning speeds.

20. The system according to claim 1, wherein
the circuitry is configured to identify the stability lobe from a plurality of stability lobes in a stability lobe diagram based on the predetermined speed of the machine, and
the stability lobe diagram indicates the relationship between machine speed and depth of cut.

21. The system according to claim 1, wherein the circuitry is configured to
generate a user interface that includes a different user selectable graphical element for each of the first set of candidate fine-tuning speeds for selection by a user.

* * * * *